US 12,464,060 B2

(12) United States Patent
Yun et al.

(10) Patent No.: US 12,464,060 B2
(45) Date of Patent: Nov. 4, 2025

(54) ANTENNA AND ELECTRONIC DEVICE INCLUDING SAME

(71) Applicant: SAMSUNG ELECTRONICS CO., LTD., Suwon-si (KR)

(72) Inventors: Sumin Yun, Suwon-si (KR); Kookjoo Lee, Suwon-si (KR); Minwoo Lee, Suwon-si (KR); Juseok Lee, Suwon-si (KR); Jinwoo Jung, Suwon-si (KR); Jaebong Chun, Suwon-si (KR); Wonhee Choe, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 18/108,868

(22) Filed: Feb. 13, 2023

(65) Prior Publication Data
US 2023/0199096 A1   Jun. 22, 2023

Related U.S. Application Data

(63) Continuation of application No. PCT/KR2021/010537, filed on Aug. 10, 2021.

(30) Foreign Application Priority Data
Aug. 14, 2020 (KR) .................. 10-2020-0102171

(51) Int. Cl.
H04M 1/02 (2006.01)
H01Q 1/24 (2006.01)
H01Q 3/36 (2006.01)

(52) U.S. Cl.
CPC .......... H04M 1/0266 (2013.01); H01Q 1/243 (2013.01); H01Q 3/36 (2013.01); *H04M 2250/22* (2013.01)

(58) Field of Classification Search
CPC ............ H04M 1/0266; H04M 2250/22; H01Q 1/243; H01Q 3/36
See application file for complete search history.

(56) References Cited

U.S. PATENT DOCUMENTS 9,618,982 B2 *   4/2017   Koo .................... G06F 3/04164
9,811,221 B2 * 11/2017   Hayashi ............... G06F 3/0445
(Continued)

FOREIGN PATENT DOCUMENTS

EP       0911906       4/1999
JP    2017-175540      9/2017
(Continued)

OTHER PUBLICATIONS

International Search Report for PCT/KR2021/010537, mailed Nov. 18, 2021, 3 pages.
(Continued)

*Primary Examiner* — Lewis G West
(74) *Attorney, Agent, or Firm* — Nixon & Vanderhye P.C.

(57) ABSTRACT

According to various embodiments of the present disclosure, an electronic device comprises: a dielectric sheet disposed between a display panel and at least one portion of a housing and includes a conductive mesh comprising a plurality of conductive lines, the dielectric sheet including at least one first mesh pattern part disposed in a first region of the dielectric sheet, a second mesh pattern part disposed in a second region at least partially surrounding the first region, and at least one dummy pattern part which segments the at least one first mesh pattern part and the second mesh pattern part in a third region between the first region and the second region; and a wireless communication circuit disposed in the housing and electrically connected to the at least one first mesh pattern part, wherein the at least one dummy pattern part may include a plurality of segments formed in the third
(Continued)

region by partially removing the plurality of conductive lines.

20 Claims, 24 Drawing Sheets

(56) References Cited

U.S. PATENT DOCUMENTS

| | | | |
|---|---|---|---|
| 9,830,013 B2* | 11/2017 | Lee | G06F 3/0443 |
| 9,904,430 B2 | 2/2018 | Shibata et al. | |
| 11,862,842 B2* | 1/2024 | Chang | H01Q 21/08 |
| 12,016,214 B2* | 6/2024 | Lee | H10D 86/443 |
| 12,066,873 B2* | 8/2024 | Yu | H01Q 1/2266 |
| 12,176,603 B2* | 12/2024 | Yun | H01Q 1/38 |
| 12,327,935 B2* | 6/2025 | Zhang | H01Q 9/045 |
| 2005/0206609 A1* | 9/2005 | Yamamoto | G09G 3/20 |
| | | | 345/104 |
| 2007/0268197 A1 | 11/2007 | Song et al. | |
| 2010/0013714 A1* | 1/2010 | Azhari | H01Q 5/378 |
| | | | 343/700 MS |
| 2013/0169548 A1* | 7/2013 | Kim | G06F 3/0446 |
| | | | 345/173 |
| 2014/0144679 A1 | 5/2014 | Hwang et al. | |
| 2014/0176840 A1* | 6/2014 | Hashido | H05K 9/0054 |
| | | | 349/33 |
| 2015/0370375 A1* | 12/2015 | Hayashi | G06F 3/0445 |
| | | | 216/13 |
| 2016/0190678 A1* | 6/2016 | Hong | H01Q 1/44 |
| | | | 343/700 MS |
| 2017/0133752 A1 | 5/2017 | Choi et al. | |
| 2018/0113347 A1* | 4/2018 | Hara | G06F 3/0445 |
| 2018/0342789 A1 | 11/2018 | Jiang et al. | |
| 2019/0058264 A1 | 2/2019 | Jung et al. | |
| 2020/0203830 A1* | 6/2020 | Tsuchiya | H01Q 7/00 |
| 2020/0251814 A1 | 8/2020 | Ryu et al. | |
| 2020/0266526 A1* | 8/2020 | Choi | H01Q 1/243 |
| 2021/0111484 A1 | 4/2021 | Jang et al. | |
| 2023/0102743 A1* | 3/2023 | Yun | H01Q 9/0407 |
| | | | 343/702 |
| 2023/0110601 A1* | 4/2023 | Lee | H01Q 1/22 |
| | | | 455/566 |
| 2023/0247121 A1* | 8/2023 | Yun | H04M 1/0266 |
| | | | 455/566 |

FOREIGN PATENT DOCUMENTS

| | | |
|---|---|---|
| KR | 10-1434031 | 8/2014 |
| KR | 10-2014-0107142 | 9/2014 |
| KR | 10-2016-0080444 | 7/2016 |
| KR | 10-2017-0053385 | 5/2017 |
| KR | 10-2018-0060299 | 6/2018 |
| KR | 10-1940797 | 1/2019 |
| KR | 10-2019-0019802 | 2/2019 |
| KR | 10-1973742 | 4/2019 |
| KR | 10-2019-0090226 | 8/2019 |

OTHER PUBLICATIONS

Written Opinion of the ISA for PCT/KR2021/010537, mailed Nov. 18, 2021, 4 pages.
Korean Office Action issued Jul. 18, 2024 in corresponding Korean Patent Application No. 10-2020-0102171.

* cited by examiner

ANTENNA AND ELECTRONIC DEVICE INCLUDING SAME

CROSS-REFERENCE TO RELATED APPLICATIONS

This application is a continuation of International Application No. PCT/KR2021/010537 designating the United States, filed on Aug. 10, 2021, in the Korean Intellectual Property Receiving Office and claiming priority to Korean Patent Application No. 10-2020-0102171, filed on Aug. 14, 2020, in the Korean Intellectual Property Office, the disclosures of which are incorporated by reference herein in their entireties.

BACKGROUND

Field

The disclosure relates to an antenna and an electronic device including the same.

Description of Related Art

With the development of wireless communication technology, electronic devices (e.g., electronic devices for communication) are commonly used in daily life, and consequently, the use of contents is increasing. Due to the increase in the use of such contents, network capacity is gradually increasing. After the commercialization of the 4G (4th generation) communication system, in order to meet the increasing demand for wireless data traffic, a communication system that transmits or receives signals using a frequency of a high-frequency (e.g., mmWave) band (e.g., a band ranging from 3 GHz to 300 GHz) (e.g., 5G (5th generation), pre-5G communication system, or new radio (NR)) is included in electronic devices.

An electronic device may include an antenna capable of transmitting and receiving signals using a frequency within a predetermined range (e.g., a frequency ranging from about 3 GHz to about 300 GHz). Antennas are being developed in an efficient mounting structure for overcoming high free space loss in terms of frequency characteristics and increasing gain, and in various forms corresponding thereto. For example, an antenna may include an array antenna in which one or more antenna elements (e.g., one or more conductive patterns and/or one or more conductive patches) are arranged on a printed circuit board. These antenna elements may be arranged such that beam patterns are formed in at least one direction inside an electronic device.

An antenna may be restricted in a radiation direction due to a nearby conductor (e.g., a conductive frame or a bezel) of an electronic device, which may affect radiation performance deterioration. Moreover, when a display including a conductive layer (e.g., a metal sheet layer or a touch layer) extends to the front surface of an electronic device, an antenna disposed in an inner space of the electronic device may have difficulty in radiation to the front side toward which the display is directed. An antenna may be disposed between a display panel and a front plate (e.g., a window layer or a front cover) for radiation to the front side toward which the display of the electronic device is directed. In this case, in order to achieve smooth radiation performance while securing visibility of the display, the antenna may be formed by splitting some portions of a conductive mesh structure configured with a plurality of conductive lines disposed on a dielectric sheet as a mesh pattern portion.

However, in the mesh pattern portion configured as a portion of the conductive mesh structure and operating as an antenna, an electric field may be induced by a peripheral conductive mesh structure split by a split portion, which may cause reduction of radiation performance such as reduction in gain of the antenna or distortion of the radiation pattern of the antenna. In addition, a sensing function or antenna performance may be deteriorated due to the addition of a dielectric sheet including a mesh pattern portion, which is provided separately from a conductive layer such as a touch layer or a fingerprint sensor. Furthermore, the thickness of the electronic device may increase when a dielectric sheet including a mesh pattern portion provided separately from a conductive layer such as a touch layer or a fingerprint sensor is added.

SUMMARY

Embodiments of the disclosure provide an antenna and an electronic device including the same.

Embodiments of the disclosure provide an antenna including a split structure capable of maintaining radiation performance of a mesh pattern portion used as an antenna and an electronic device including the same.

Embodiments of the disclosure provide an antenna including a mesh pattern portion disposed on the same layer as a conductive pattern portion for sensing and an electronic device including the same.

According to various example embodiments, an electronic device may include: a housing, a display panel disposed in an inner space of the housing to be visible from the outside through at least a portion of the housing, a dielectric sheet comprising a conductive mesh disposed between the display panel and at least a portion of the housing and including a plurality of conductive lines, wherein the dielectric sheet includes at least one first mesh pattern portion disposed in a first area of the dielectric sheet, a second mesh pattern portion disposed in a second area at least partially surrounding the first area, and at least one dummy pattern splitting the at least one first mesh pattern portion and the second mesh pattern portion in a third area between the first area and the second area, and a wireless communication circuit disposed in the inner space and electrically connected to the at least one first mesh pattern portion. The at least one dummy pattern portion may include a plurality of split portions provided by partially removing the plurality of conductive lines in the third area, and at least some of the plurality of split portions may be located at positions having different distances from an imaginary line extending in parallel along the length direction of the third area.

Various example embodiments of the disclosure are able to help maintain antenna performance since a mesh pattern portion used as an antenna is split from a peripheral mesh pattern portion through split portions having an irregular or at least partially regular arrangement structure. In addition, since a mesh pattern portion used as an antenna is disposed on the same layer as a peripheral mesh pattern portion performing a sensing function, it is possible to reduce the thickness of an electronic device.

In addition, various effects identified directly or indirectly through this disclosure may be provided.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
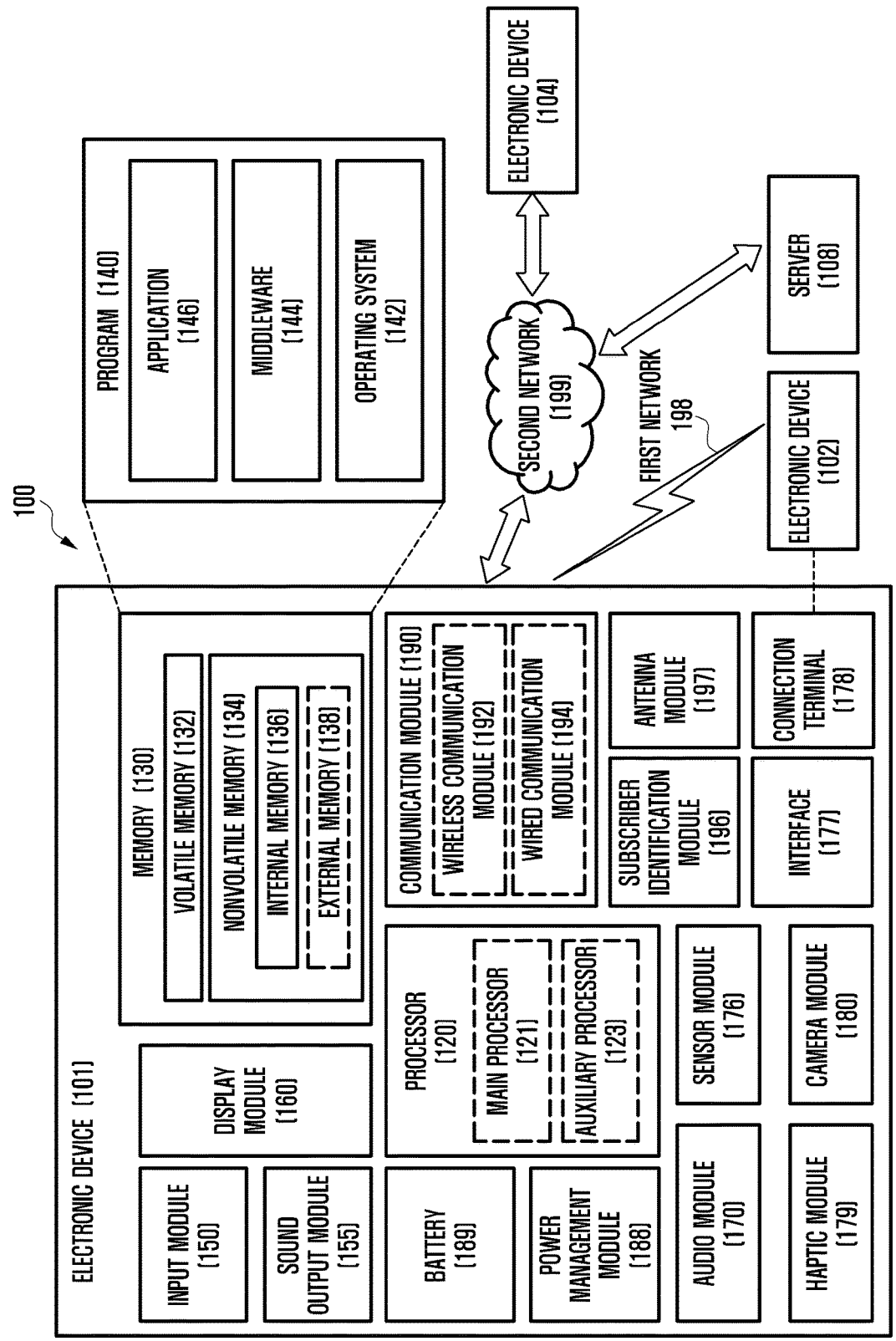
FIG. 1 is a block diagram illustrating an example electronic device in a network environment according to various embodiments.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module ice 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
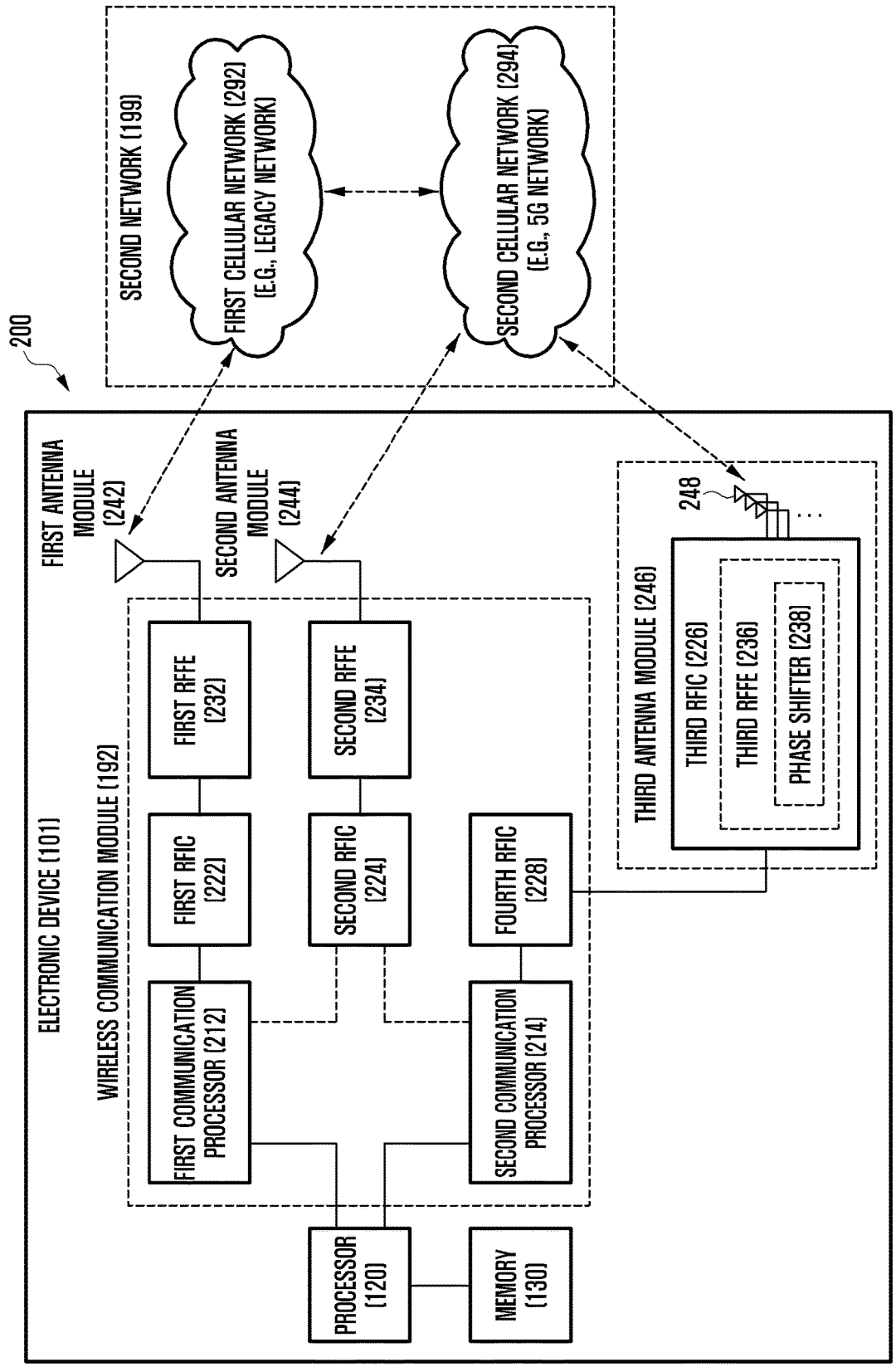
FIG. 2 is a block diagram illustrating an example configuration of an electronic device configured to support a legacy network communication and a 5G network communication, according to various embodiments.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel.

According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
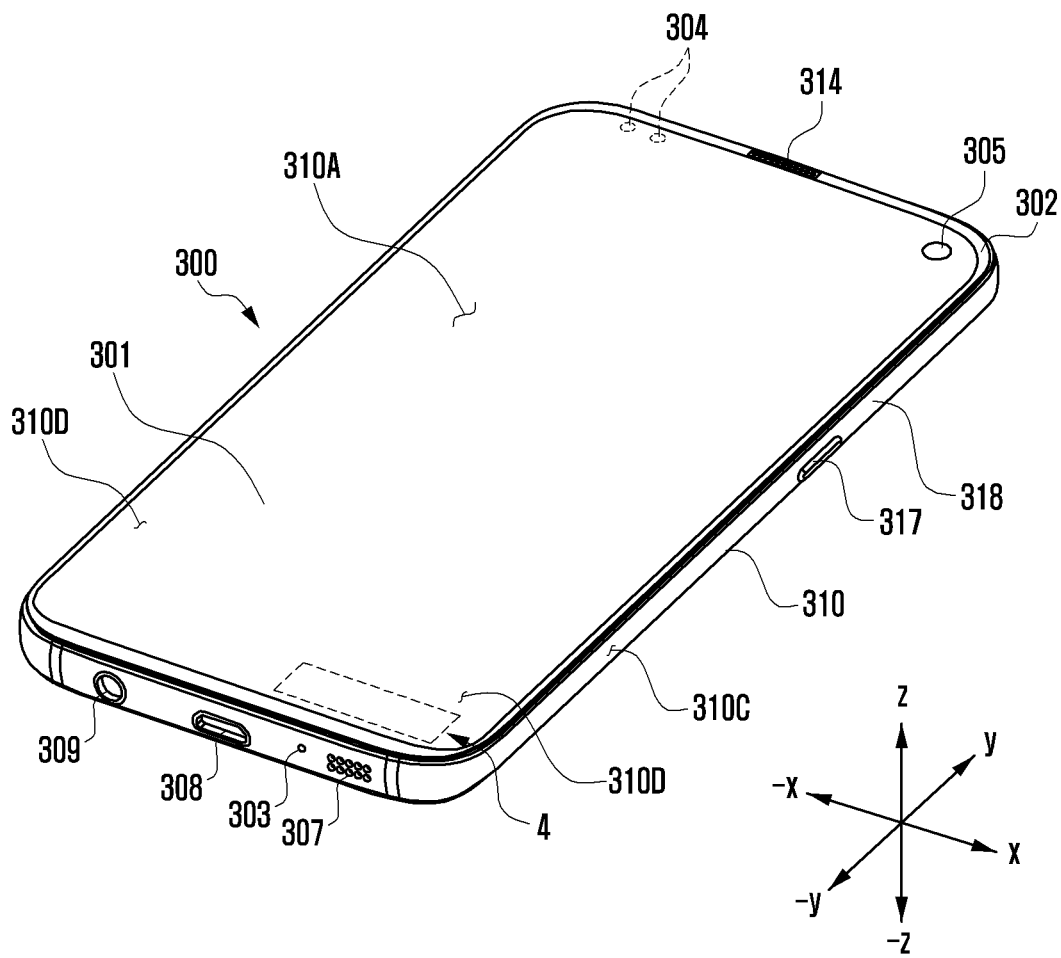
FIG. 3A is a front perspective view of a mobile electronic device according to various embodiments.
Figure 3B:
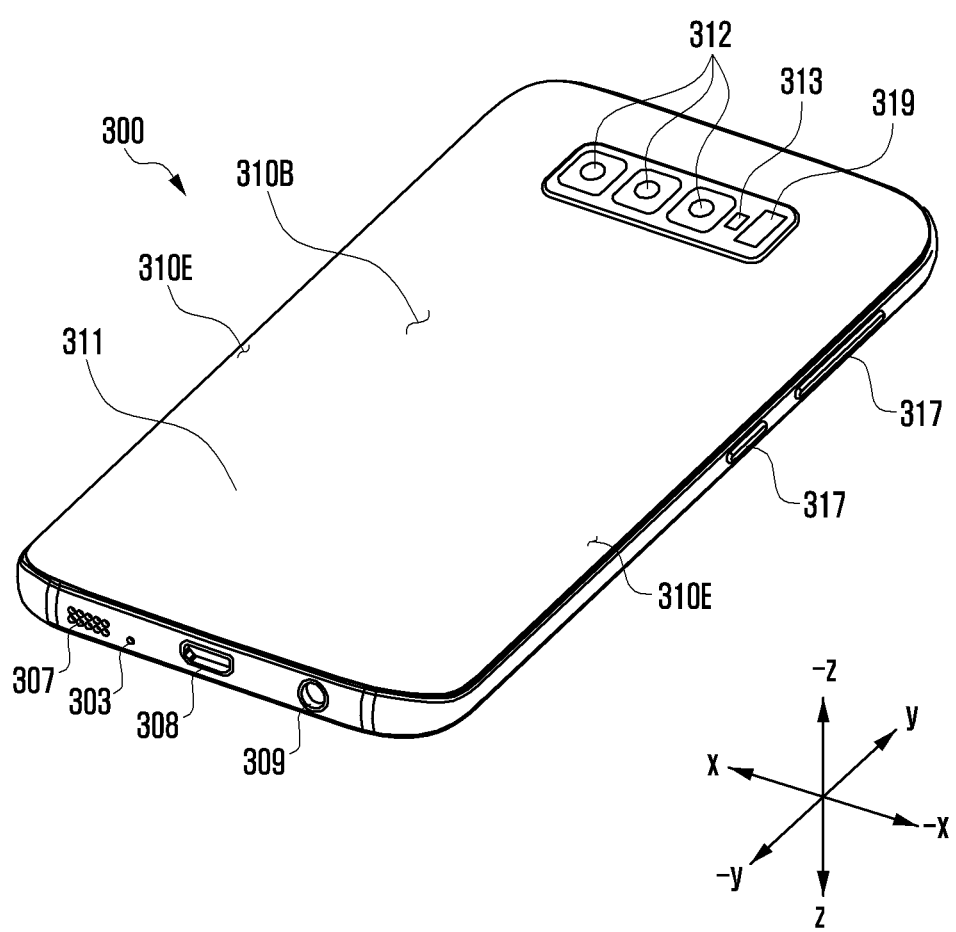
FIG. 3B is a rear perspective view of the mobile electronic device according to various embodiments.

FIG. 3A is a front perspective view of a mobile electronic device according to various embodiments, and FIG. 3B is a rear perspective view of the mobile electronic device shown in FIG. 3A according to various embodiments.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (e.g., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 5A:
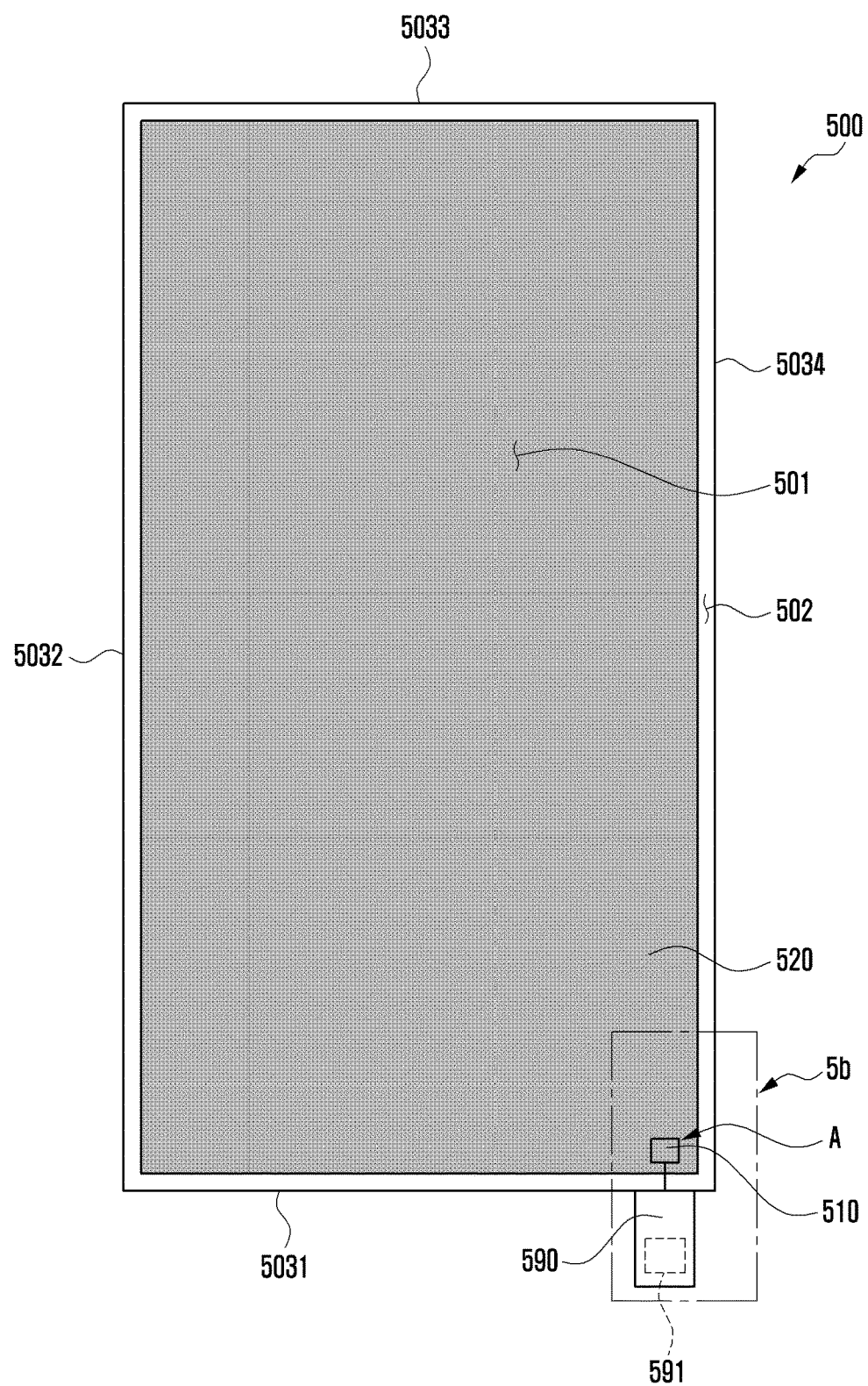
FIG. 5A is a diagram illustrating a configuration of a dielectric sheet according to various embodiments.

According to various embodiments, an electronic device 300 may include an antenna (e.g., the antenna A in FIG. 5A) including at least one antenna element (e.g., the mesh pattern portion 510 in FIG. 5A). According to an embodiment, an antenna (e.g., the antenna A in FIG. 5A) may be disposed in the inner space of the electronic device 300 at an area at least partially overlapping the display 301 when the display 301 is viewed from above, and may form a beam pattern in a direction (the z-axis direction) in which the display 301 is oriented.

Figure 3C:
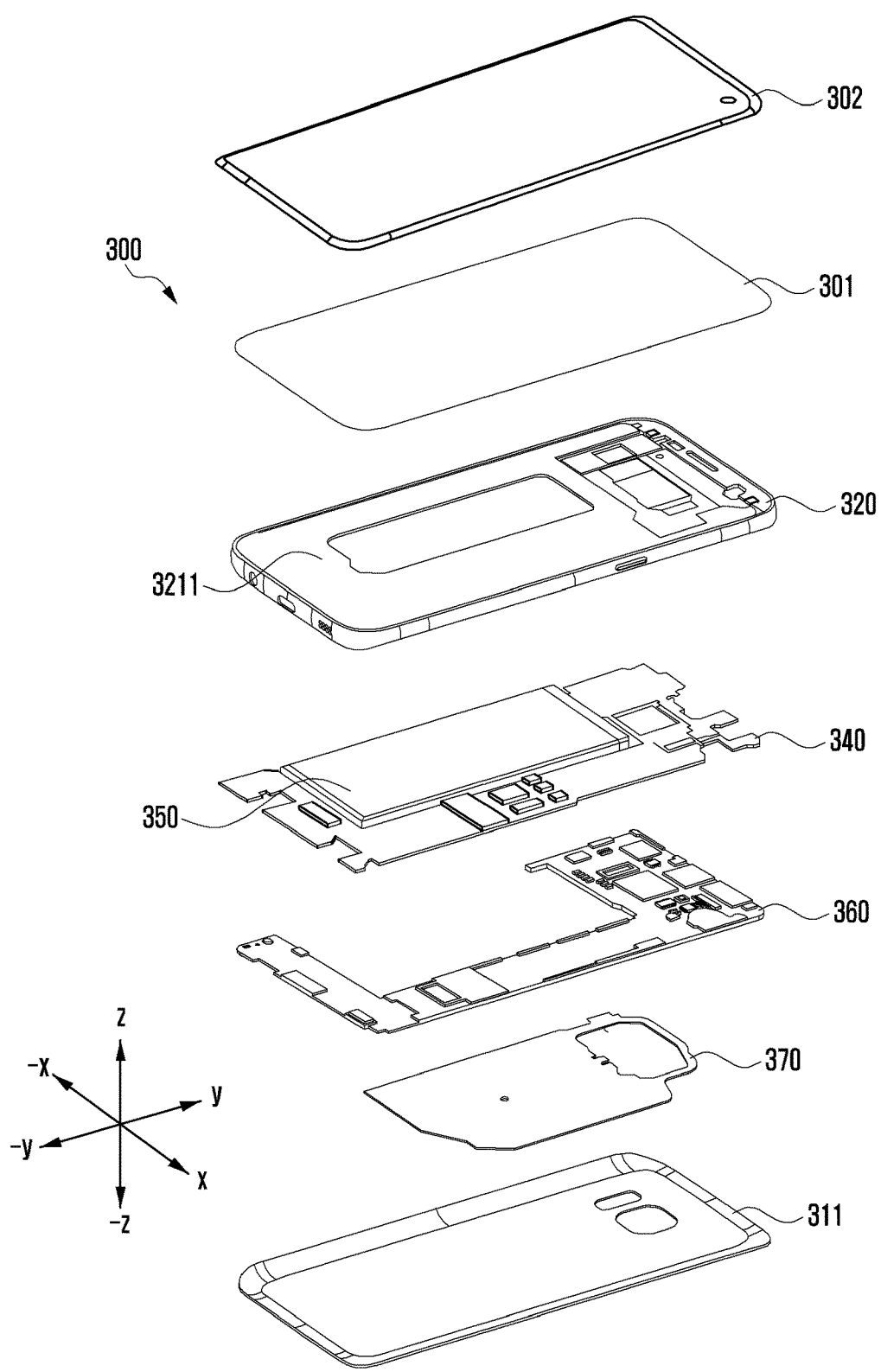
FIG. 3C is an exploded perspective view of the mobile electronic device according to various embodiments.

FIG. 3C is an exploded perspective view illustrating the mobile electronic device shown in FIG. 3A according to various embodiments.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3A or FIG. 3B, thus, descriptions thereof may not be repeated.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4:
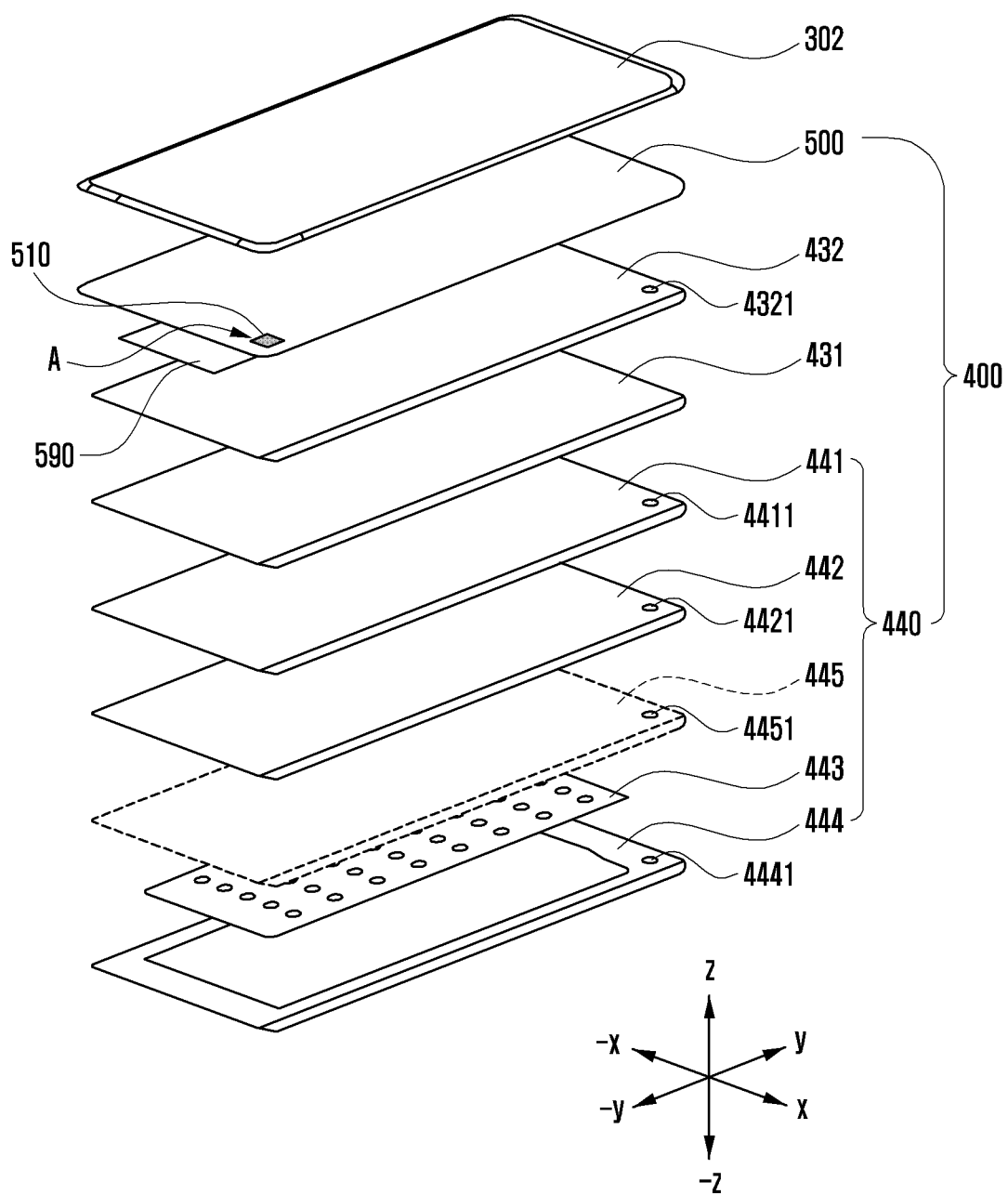
FIG. 4 is an exploded perspective view of a display according to various embodiments.

FIG. 4 is an exploded perspective view of a display 400 according to various embodiments.

The display 400 of FIG. 4 may be at least partially similar to the display 301 of FIG. 3A or may further include various embodiments of the display.

Referring to FIG. 4, the display 400 may include a dielectric sheet 500 laminated on the rear surface of a front surface plate 302 (e.g., a transparent cover, a front cover, a glass plate, a first cover member, or a cover member) via an adhesive member, a polarizer (POL) 432 (e.g., a polarizing film); a display panel 431, and/or at least one subsidiary material layer 440. According to an embodiment, the adhesive member may include an optical clear adhesive (OCA), a pressure-sensitive adhesive (PSA), a heat-responsive adhesive, a general adhesive, or a double-sided tape. According to an embodiment, the display panel 431 and the POL 432 may be integrally configured. In various embodiments, the display 400 may further include a touch sensor (e.g., the touch sensor 800 of FIG. 10) disposed between the front plate 302 and the polarizer 432, between the display panel 431 and the polarizer 432, or in the display panel 431.

According to various embodiments, the display 400 may include a control circuit (not illustrated). According to an embodiment, the control circuit may include a flexible printed circuit board (FPCB) electrically interconnecting a printed circuit board (e.g., the printed circuit board 340 in FIG. 3C) and the display panel 431 of the electronic device (e.g., the electronic device 300 in FIG. 3), and a display driver IC (DDI) disposed on the FPCB. According to an embodiment, when the display 400 includes a touch sensor and operates as an in-cell-type or on-cell-type touch display depending on the arrangement position of the touch sensor, the control circuit may include a touch display driver IC (TDDI). In an embodiment, the display 400 may include a fingerprint sensor (not illustrated) arranged around the control circuit. According to an embodiment, the fingerprint sensor may include an ultrasonic fingerprint sensor or an optical fingerprint sensor that is capable of recognizing a fingerprint of a finger that is brought into contact with or located adjacent to the outer surface of the front plate 302 through holes at least partially provided in some of the components of the display 400.

According to various embodiments, the display 400 may include a dielectric sheet 500 disposed under the front plate 302. According to an embodiment, the dielectric sheet 500 may include a conductive mesh structure (e.g., the conductive mesh structure 501 of FIG. 5C) configured with a plurality of conductive lines (e.g., the conductive lines 515 of FIG. 5C). According to an embodiment, the dielectric sheet 500 may include at least one mesh pattern portion 510 the shape of which is formed by a plurality of split portions (e.g., the split portions 540 or 550 in FIG. 5C) provided by removing at least some of the conductive lines (e.g., the conductive lines 515 of FIG. 5C). According to an embodiment, at least one mesh pattern portion 510 may operate as an antenna by being electrically connected to a wireless communication circuit (e.g., the wireless communication circuit 591 of FIG. 5B) (e.g., the wireless communication module 192 of FIG. 1) of the electronic device (e.g., the electronic device 303 of FIG. 3A) via a flexible printed circuit board (FPCB) 590 electrically connected thereto. According to an embodiment, the wireless communication module 192 may be configured to transmit and/or receive wireless signals of a predetermined frequency band (e.g., about 3 GHz to about 300 GHz) via the at least one mesh pattern portion 510. In various embodiments, the at least one mesh pattern portion 510 may operate as an array antenna (e.g., the array antenna AR of FIG. 8) by including at least two mesh pattern portions (e.g., the mesh pattern portions 510, 510-1, 510-2, and 510-3 in FIG. 8) spaced apart from each other in the dielectric sheet 500. According to an embodiment, the antenna A including the mesh pattern portion 510 may form a beam pattern in a direction (the z-axis direction) in which the front plate 302 of the electronic device 300 is oriented. According to an embodiment, at least a portion of the antenna A including the mesh pattern portion 510 may be disposed at a position overlapping an active area (display area) of the display panel 431 when the front plate 302 is viewed from above. In various embodiments, at least a portion of the antenna A may be disposed in an area overlapping a non-active area (non-display area) of the display panel 431. For example, the antenna A including the mesh pattern portion 510 may be arranged in area 4 in FIG. 3A, but is not limited thereto. In various embodiments, the antenna A including the mesh pattern portion 510 may be disposed to overlap various positions of the display 400. In various embodiments, a plurality of antennas A including at least one mesh pattern portion 510 may be included and disposed in different areas overlapping the display.

Figure 5B:
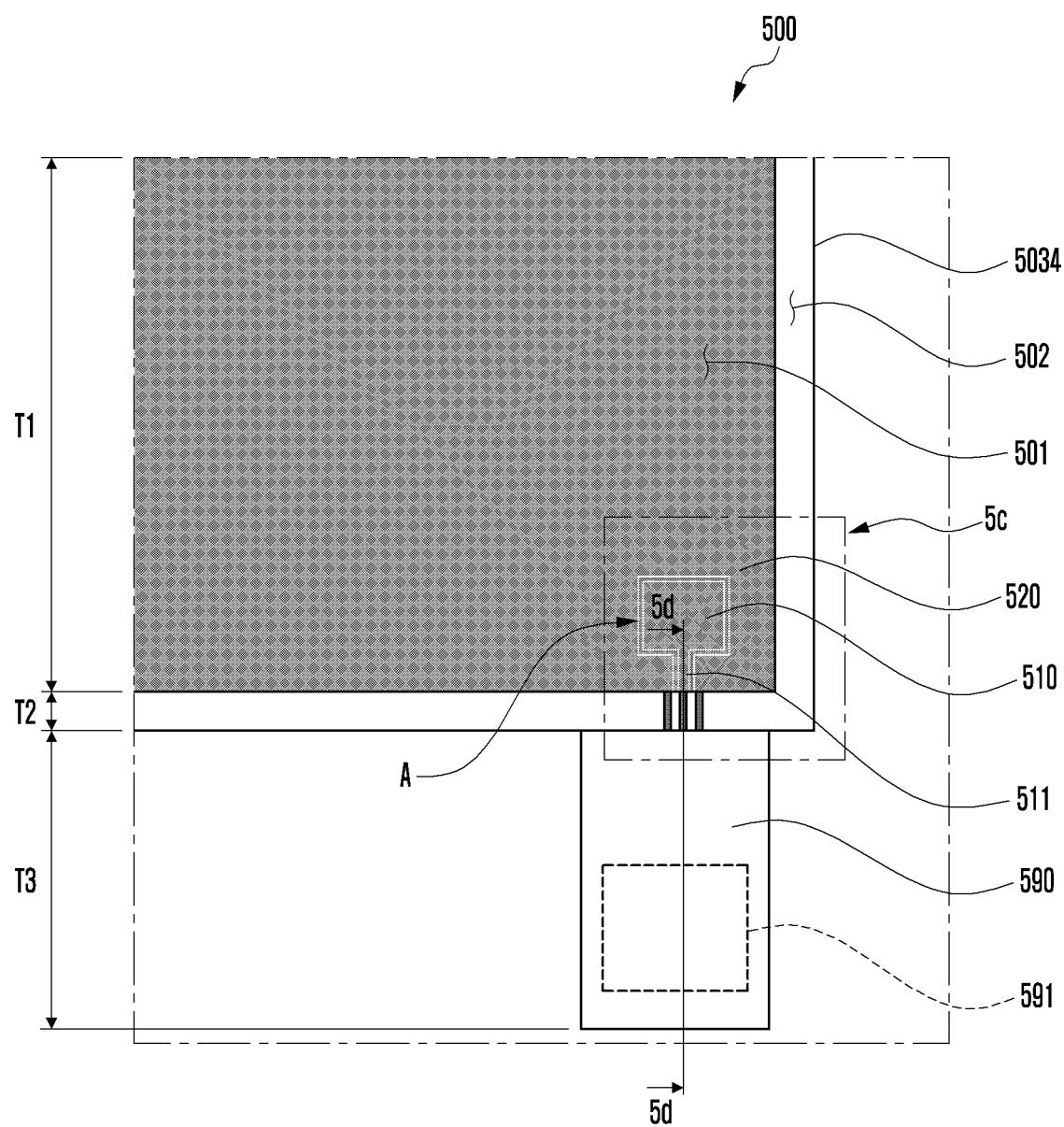
FIG. 5B is a diagram illustrating an enlarged view of area 5b of FIG. 5A according to various embodiments.
Figure 5C:
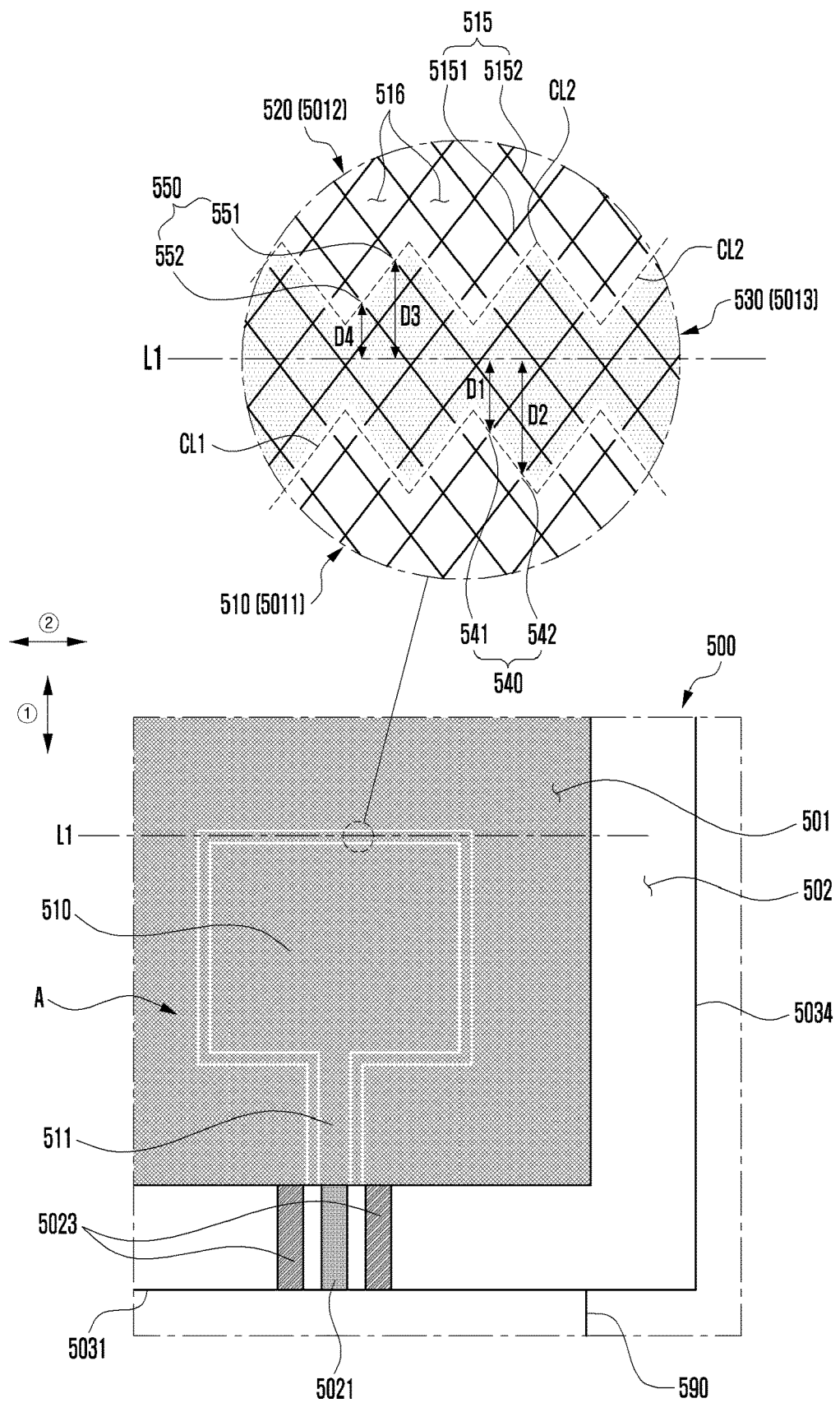
FIG. 5C is a diagram illustrating an enlarged view of area 5c of FIG. 5B according to various embodiments.
Figure 5D:
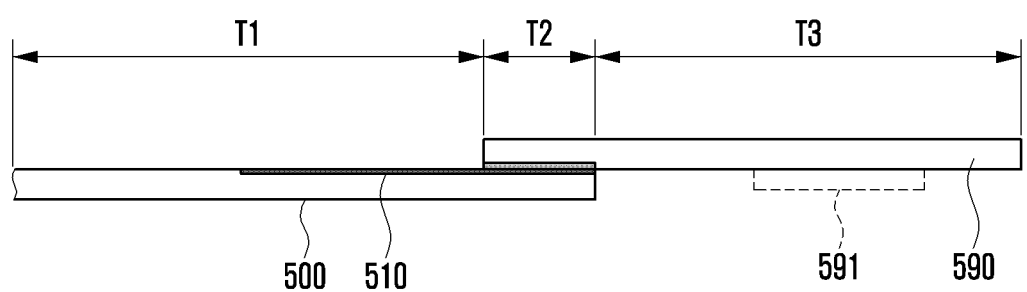
FIG. 5D is a cross-sectional view of a portion of the dielectric sheet taken along line 5d-5d in FIG. 5B according to various embodiments.
Figure 5E:
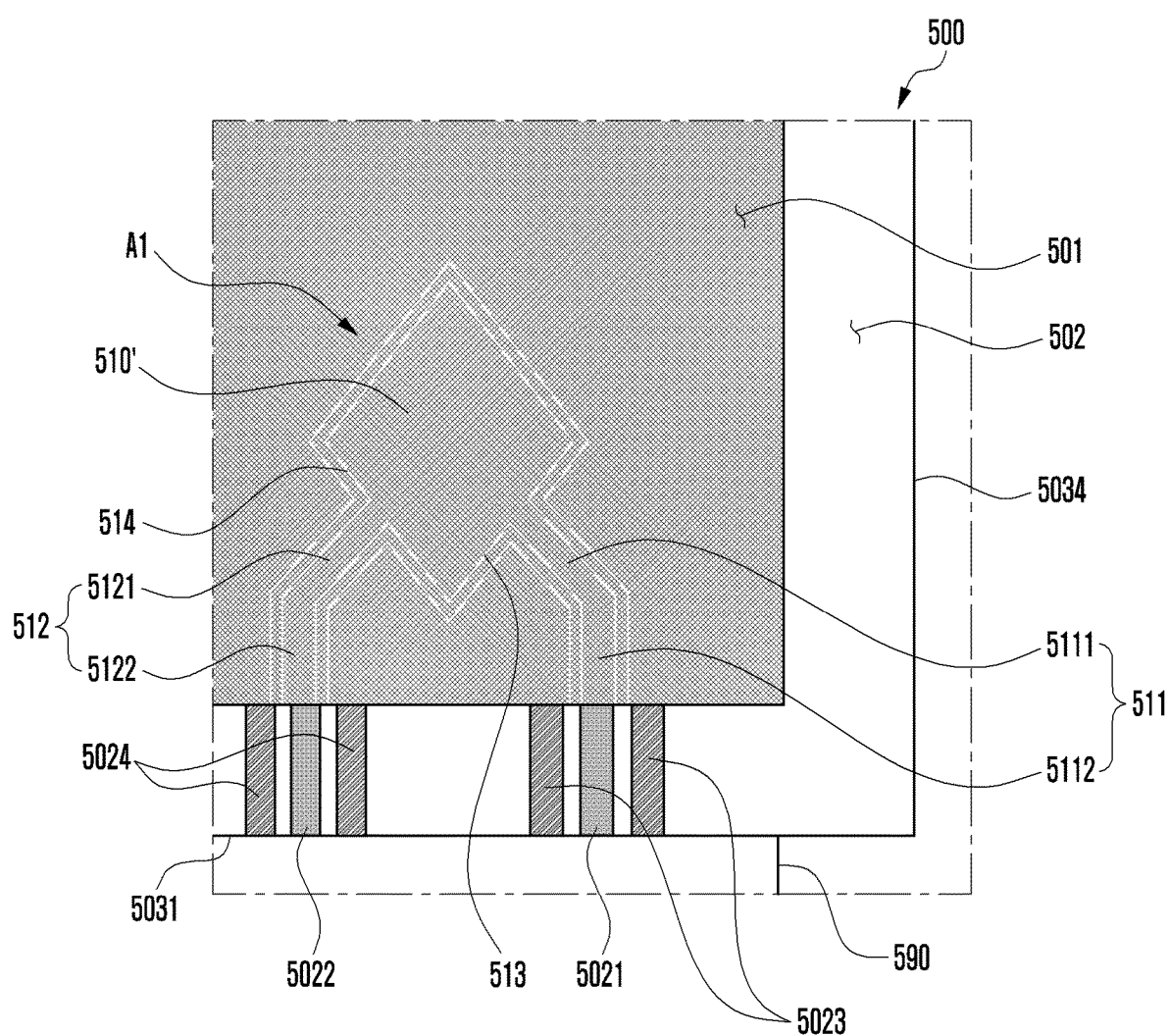
FIGS. 5E and 5F are diagrams each illustrating an example configuration of a portion of a dielectric sheet according to various embodiments.

In various embodiments, the antenna A including a mesh pattern portion (e.g., the mesh pattern portion 510-1 of FIG. 8) may include two feed portions (e.g., the first feed line 511 and the second feed line 512 of FIG. 5E) for forming two polarized waves that cross each other. According to an embodiment, the two feed portions may include a first feed portion (e.g., the first feed line 511 of FIG. 5E) disposed at a first point on a first imaginary line passing through the center of the mesh pattern portion (e.g., the mesh pattern portion 510-1 of FIG. 8), and a second feed portion (e.g., the second feed line 512 of FIG. 5C) disposed at a second point on a second imaginary line that passes through the center of the mesh pattern portion (e.g., the mesh pattern portion 510-1 of FIG. 8) and intersects the first imaginary line at the center of the mesh pattern portion (e.g., the mesh pattern portion 510-1 of FIG. 8). In various embodiments, the two imaginary lines may intersect each other at a non-orthogonal or non-perpendicular angle. According to an embodiment, the conductive member 444 (e.g., a metal sheet layer) of the display 400 may be applied as a ground for the antenna A including the at least one mesh pattern portion 510.

According to various embodiments, the at least one mesh pattern portion 510 may maintain the state split from a peripheral conductive mesh structure by a dummy pattern portion (e.g., the dummy pattern portion 530 in FIG. 5C) provided by a plurality of split portions (e.g., the split portions 540 and 550 of FIG. 5C). According to an embodiment, the plurality of split portions (e.g., the split portions 540 and 550 of FIG. 5C) of the dummy pattern portion may be irregularly (randomly) arranged or at least partially regularly arranged. Thus, it is possible to reduce the visibility of the mesh pattern portion 510 from the outside and to prevent and/or reduce performance degradation of the antenna by reducing the capacitance of the peripheral conductive mesh structure.

According to various embodiments, the at least one subsidiary material layer 440 may include one or more polymer members 441 and 442 disposed on the rear surface of the display panel 431 (the z-axis direction), at least one functional member 443 disposed on the rear surface of the one or more polymer members 441 and 442 (the -z-axis direction), and/or a conductive member 444 disposed on the rear surface of the at least one functional member 443 (the -z-axis direction). According to an embodiment, the at least one polymer member 441 or 442 may include a light shielding layer 441 (e.g., a black layer including an uneven pattern) configured to remove air bubbles that may be generated between the display panel 431 and its lower attachments and block light generated by the display panel 431 or light incident from the outside, and/or a buffer layer 442 disposed for shock absorption. According to an embodiment, the at least one functional member 443 may include a heat dissipation sheet (e.g., a graphite sheet) for heat dissipation, a force touch FPCB, a fingerprint sensor FPCB, an antenna radiator for communication, a conductive/non-conductive tape, or an open cell sponge. According to an embodiment, the conductive member 444, which is a metal sheet (e.g., a metal plate), may be helpful for reinforcing the rigidity of an electronic device (e.g., the electronic device 300), and may be used to block ambient noise and disperse heat released from surrounding heat release components. According to an embodiment, the conductive member 444 may include Cu, Al, Mg, SUS, or CLAD (e.g., a stacked member in which SUS and Al are alternately disposed). As an embodiment, the display 400 may further include a detection member 445 configured to detect an input through an electromagnetic induction type electronic pen. According to an embodiment, the detection member 445 may include a digitizer. According to an embodiment, the detection member 445 may be disposed between the at least one polymer member 442 and the functional member 443. In an embodiment, the detection member 445 may be disposed between the display panel 431 and the at least one polymer member 443.

According to various embodiments, the subsidiary material layer 440 may include openings 4321, 4411, 4421, 4441, or 4451 disposed in the inner space of the electronic device 300. For example, the openings 4321, 4411, 4421, 4441, or 4451 may be used as an external environment detection path for a sensor module (e.g., the sensor module 304 of FIG. 3A) and/or a camera device (e.g., the sensor module 305 of FIG. 3A) disposed in an inner space of the electronic device 300. In various embodiments, the polarizer 432 may be processed to be transparent or to remove a polarization property at a position corresponding to the sensor module and/or the camera device without an opening 4321. In various embodiments, the display panel 431 may be configured such that a location corresponding to the sensor module and/or the camera device has a higher transmittance than the peripheral area without an opening. In this case, an area of the display panel 431 corresponding to the sensor module and/or the camera device may be configured such that pixels and/or a wiring structure are omitted therefrom or the area have a lower pixel density and/or wiring density than the peripheral area.

FIG. 5A is a diagram illustrating an example configuration of a dielectric sheet 500 according to various embodiments. FIG. 5B is a diagram illustrating an enlarged view of area 5b in FIG. 5A according to various embodiments. FIG. 5C is a diagram illustrating an enlarged view of area 5c of FIG. 5B according to various embodiments.

Referring to FIG. 5A, the dielectric sheet 500 may be disposed under the front plate (e.g., the front plate 302 in FIG. 4) (e.g., the -Z axis direction of FIG. 4) at a position substantially overlapping the display panel (e.g., the display panel 431 in FIG. 4) when the front plate (e.g., the front plate 302 in FIG. 4) is viewed from above. According to an embodiment, the dielectric sheet 500 may be made of a transparent polymer material. According to an embodiment, the dielectric sheet 500 may have a rectangular shape. As another example, the dielectric sheet 500 may have a shape corresponding to the shape of the display panel (e.g., the display panel 431 of FIG. 4). According to an embodiment, the dielectric sheet 500 may include a first edge 5031 having a first length, a second edge 5032 extending in a substantially perpendicular direction from the first edge 5031 and having a length longer than the first length, a third edge 5033 extending substantially parallel to the first edge 5031 from the second edge 5032 and having the first length, and a fourth edge 5034 extending from the third edge 5033 to the first edge 5031 substantially parallel to the second edge 5032 and having the second length. According to an embodiment, the dielectric sheet 500 may include a conductive mesh structure configured with a plurality of conductive lines (e.g., the conductive lines 515 of FIG. 5C), and a peripheral area 502 disposed around the conductive mesh structure 501. According to an embodiment, at least a portion of the conductive mesh structure 501 may be disposed at a position overlapping an active area (display area) of the display panel (e.g., the display panel 431 of FIG. 4) when the front plate (e.g., the front plate 302 of FIG. 4) is viewed from above. According to an embodiment, at least a portion of the peripheral area 502 may be disposed at a position overlapping a non-active area (non-display area) of the display panel (e.g., the display panel 431 of FIG. 4) when the front plate (e.g., the front plate 302 of FIG. 4) is viewed from above. In various embodiments, the conductive mesh structure 501 may be smaller than or larger than the active area of the display panel (e.g., the display panel 431 of FIG. 4).

According to various embodiments, the dielectric sheet 500 may include a first mesh pattern portion 510 (e.g., the at least one mesh pattern portion 510 of FIG. 4) configured with a plurality of conductive lines (e.g., the conductive lines 515 of FIG. 5C) and used as the antenna A. According to an embodiment, the first mesh pattern portion 510 used as the antenna A may be disposed near the first edge 5031 of the dielectric sheet 500. However, the disclosure is not limited thereto, and the first mesh pattern portion 510 may be disposed near the second edge 5032, the third edge 5033, and/or the fourth edge 5034. According to an embodiment, a flexible printed circuit board (FPCB) 590 may be electrically connected to the first mesh pattern portion 510 at the first edge 5031 of the dielectric sheet 500. According to an embodiment, the FPCB 590 may have a length that is electrically connectable to a printed circuit board (e.g., the printed circuit board 340 of FIG. 3C) of an electronic device (e.g., the electronic device 300 of FIG. 3C). According to an embodiment, the FPCB 590 may include a wireless communication circuit 591 (e.g., the third RFIC 226 of FIG. 2). In various embodiments, the wireless communication circuit 591 may be mounted on the printed circuit board (e.g., the printed circuit board 340 in FIG. 3C) of the electronic device (e.g., the electronic device 300 in FIG. 3C), and may be electrically connected to the antenna A via the FPCB 590.

According to various embodiments, the wireless communication circuit 590 may be configured to form a beam pattern in a direction (e.g., the +z-axis direction of FIG. 4) in which the front plate is oriented via the antenna A configured with the first mesh pattern portion 510. According to an embodiment, the wireless communication circuit 591 may be configured to transmit and/or receive wireless signals in a frequency band ranging from about 3 GHz to about 300 GHz via the antenna A including the mesh pattern portion 510.

Referring to FIG. 5B, the antenna A may include a first mesh pattern portion 510 configured with at least some of a plurality of conductive lines (e.g., the conductive lines 515 of FIG. 5C) near the first edge 5031 of the dielectric sheet 500. According to an embodiment, the first mesh pattern portion 510 may have a rectangular shape. According to an embodiment, the first mesh pattern portion 510 may have a polygonal shape including a rhombus, a circle, an ellipse, a square, or a rectangle.

Referring to FIG. 5C, the dielectric sheet 500 may include a conductive mesh structure 501 configured with the plurality of conductive lines 515, and a peripheral area 502 disposed to surround at least a portion of the conductive mesh structure 501. According to an embodiment, the conductive mesh structure 501 may include a plurality of unit patterns 516 having a rhombus shape in which a first diagonal line in a vertical direction (e.g., direction (1)) is longer than a second diagonal line in the horizontal direction (e.g., direction (2). According to an embodiment, the conductive mesh structure 501 may be configured with a plurality of conductive lines 515. For example, the conductive mesh structure 501 may be configured with a plurality of conductive lines 515 including a first plurality of conductive lines 5151 arranged at predetermined intervals in a first direction, and a second plurality of conductive lines 5152 intersecting the first direction and arranged at predetermined intervals.

According to various embodiments, the dielectric sheet 500 may include a first mesh pattern portion 510 disposed in a first area 5011 of the conductive mesh structure 501, a second mesh pattern portion 520 disposed in a second area 5012 surrounding at least a portion of the first area 5011, and a dummy pattern portion 530 splitting the first mesh pattern portion 510 and the second mesh pattern portion 520 from in a third area 5013 from each other between the first area 5011 and the second area 5012. According to an embodiment, the first mesh pattern portion 510 may be used as an antenna by being electrically connected to a wireless communication circuit (e.g., the wireless communication module 192 of FIG. 1) of an electronic device (e.g., the electronic device 300 of FIG. 3). According to an embodiment, the second mesh pattern portion 520 may be used as a touch sensor (e.g., the touch sensor 800 of FIG. 10), which is electrically connected to another control circuit (e.g., a touch driver IC) of the electronic device and includes electrode patterns at least partially split by a plurality of split portions provided at predetermined positions.

According to various embodiments, the first mesh pattern portion 510 and/or the second mesh pattern portion 520 may have shapes determined by the dummy pattern portion 530 configured with a plurality of split portions 540 and 550. According to an embodiment, the plurality of split portions 540 and 550 for configuring the dummy pattern portion 530 may be arranged irregularly (randomly) or at least partially regularly. For example, the dummy pattern portion 530 may be configured with a first plurality of split portions 540 provided by partially removing the conductive lines 515 and a second plurality of split portions 550 spaced apart from the first plurality of split portions 540 at predetermined intervals. According to an embodiment, the dummy pattern portion 530 may be arranged such that the first mesh pattern portion 510 and the second mesh pattern portion 520 are split from each other by the first plurality of split portions 540 located in portions at which a first split line CL1 and the conductive lines 515 intersect each other and the second plurality of split portions 550 located in portions at which a second split line CL2 and the conducive lines intersect each other. According to an embodiment, the first split line CL1 and the second split line CL2 may be non-straight lines. According to an embodiment, the first split portion 541 of the first plurality of split portions 540 and the second split portions 542 disposed around the first split portions 541 may be arranged to have different distances D1 and D2 (e.g., vertical distances) from the first imaginary line L1 extending along the length direction of the third area 5013. In various embodiments, the first imaginary line L1 may be substantially parallel to the first direction and/or second direction of the conductive lines 511. For example, the first distance D1 between the first split portions 541 and the first imaginary line L1 may be greater than the second distance D2 between the second split portions 542 and the first imaginary line L1. According to an embodiment, third split portions 551 of the second plurality of split portions 550 and fourth split portions 552 arranged around the third split portions 551 may be arranged to have different distances D3 and D4 (e.g., vertical distances) from the first imaginary line L1. For example, the third distance D3 between the third split portions 551 and the first imaginary line L1 may be greater than the fourth distance D4 between the fourth split portions 552 and the first imaginary line L1. In various embodiments, at least some of the plurality of split portions 540 and 550 may be arranged at regular intervals or irregular intervals to have different intervals from the first imaginary line L1. According to an embodiment, by the plurality of split portions 540 and 550, a phenomenon in which the first mesh pattern portion 510 is visually recognized from the outside may be reduced. In addition, by providing plurality of split portions 540 and 550 to configure the dummy pattern portion 530, it is possible to reduce the degradation of radiation performance of the first mesh pattern portion 510 operating as an antenna through capacitance reduction by the peripheral conductive lines 515. According to an embodiment, the plurality of split portions 540 and 550 may be arranged such that the intervals thereof from the first imaginary line L1 have predetermined values, respectively, in a predetermined area or a predetermined probability distribution centered on a predetermined value (e.g., a Gaussian distribution).

According to various embodiments, the first mesh pattern portion 510 may include a feed line 511 arranged to extend from the first mesh pattern portion 510 toward the first edge 5031 of the dielectric sheet 500 through the plurality of conductive lines 515. According to an embodiment, the feed line 511 may extend from the mesh pattern portion 510 and may be electrically connected to a feed pad 5021 disposed in the peripheral area 502 of the dielectric sheet 500. According to an embodiment, the dielectric sheet 500 may include conductive pads 5023 disposed on one side and the other side of the power supply pad 5021 at the first edge 5031. According to an embodiment, the conductive pads 5023 may be electrically connected to a ground of an FPCB 590 connected to the dielectric sheet 500, thereby helping block, for example, noise of the feed pad 5201 used as a signal line. For example, the feed pad 5021 and the conductive pads 5023 may operate as a coplanar waveguide (CPW).

FIG. 5D is a cross-sectional view of a portion of the dielectric sheet 500 according to various embodiments, taken along line 5d-5d of FIG. 5B.

Referring to FIG. 5D, the dielectric sheet 500 may include a first section T1 including a conductive mesh structure 501 at least partially overlapping a display area of a display (e.g., the display 400 of FIG. 4), and a second section T2 including a peripheral area 502 at least partially surrounding the first section T1 and at least partially overlapping a non-display area of the display 400. At least a portion of the FPCB 590 electrically connected to at least a partial area of the second section T2 may be disposed on a third section T3. According to an embodiment, the first section T1 may include a first mesh pattern portion 510 used as an antenna A and feed lines 511 and 512. According to an embodiment, the second section T2 may include feed pads 5021 and 5022 electrically connected to the feed lines 511 and 512, and conductive pads 5023 and pads 5024 surrounding the feed pads 5021 and 5022, respectively. According to an embodiment, the third section T3 may include the FPCB 590 as a transmission line. In various embodiments, the FPCB 590 may further include a wireless communication circuit 591 (e.g., the third RFIC 226 of FIG. 2) disposed on at least one surface thereof.

According to an embodiment, at least a portion of the FPCB 590 may be located in the second section T2. For example, the FPCB 590 may be electrically connected to the first feed pad 5021, the second feed pad 5022, the first conductive pads 5023, or the second conductive pads 5024 in the second section T2.

Figure 5F:
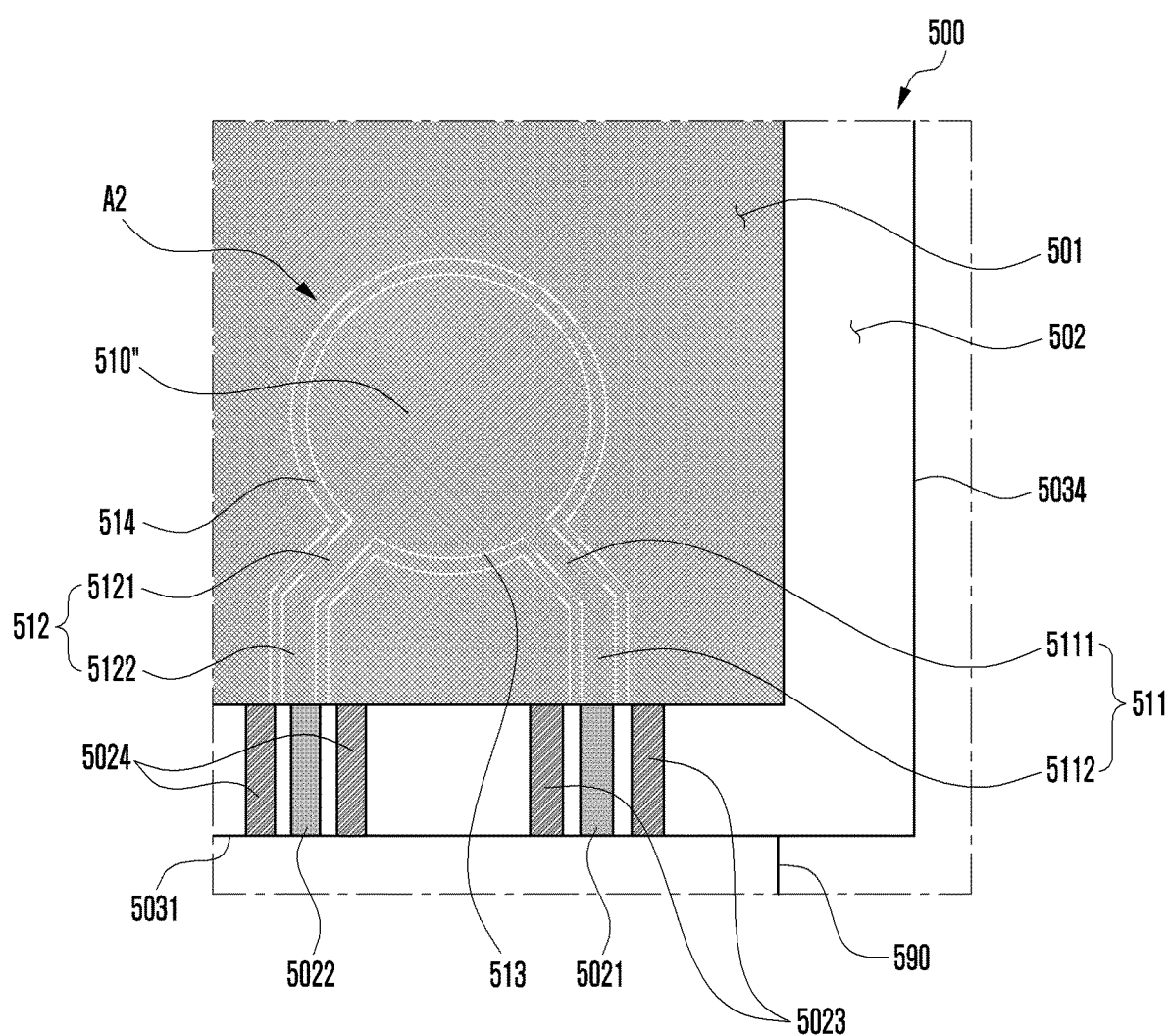

FIGS. 5E and 5F are diagrams each illustrating an example configuration of a portion of a dielectric sheet according to various embodiments.

Referring to FIG. 5E, a first mesh pattern portion 510' may have a rhombic shape, and may operate as a dual polarization antenna A1 in which polarized waves orthogonal to each other are generated by two feed lines 511 and 512 located on two imaginary lines that pass through the center of the first mesh pattern portion 510' and intersect each other. According to an embodiment, the first mesh pattern portion 510' may include a first feed line 511 and a second feed line 512 extending from the first mesh pattern portion 510' and electrically connected to the FPCB 590. According to an embodiment, the wireless communication circuit 591 may be configured to transmit and/or receive a first signal having a first polarized wave via the first feed line 511. According to an embodiment, the wireless communication circuit 591 may be configured to transmit and/or receive a second signal having a second polarized wave perpendicular to the first polarized wave via the second feed line 512.

According to various embodiments, the rhombus-shaped first mesh pattern part 510' may configure substantially the same length of the current propagation paths using the rhombus shape of a plurality of unit patterns (e.g., the unit patterns 516 of FIG. 5C), thereby improving isolation between feed ports of and/or cross-polarization characteristics of the first mesh pattern portion 510'. For example, the feed ports of the first mesh pattern portion 510' may be the portions where the first feed line 511 and the second feed line 512 are connected to the first mesh pattern portion 510'.

According to various embodiments, the first mesh pattern portion 510' may have a first side 513 and a second side 514 provided to adjoin each other at a position close to the first edge 5031 of the dielectric sheet 500, and may include a first feed line 511 extending from the first side 513 and a second feed line 512 extending from the second side 514. According to an embodiment, the first feed line 511 may extend from the first side 513 of the first mesh pattern portion 510' and may be electrically connected to a first feed pad 5021 disposed in the peripheral area 502 of the dielectric sheet 500. According to an embodiment, the second feed line 512 may extend from the second side 514 of the first mesh pattern portion 510' and may be electrically connected to a second feed pad 5022 disposed in the peripheral area 502 of the dielectric sheet 500. According to an embodiment, the first feed line 511 may include a first sub-line 5111 connected to the first side 513 to be substantially perpendicular to the first side 513, and a second sub-line 5112 extending from the first-sub line 5111 to the first feed pad 5021 in a direction substantially perpendicular to the first edge 5031. For example, the first sub-line 5111 may be connected to substantially the center of the first side 513. According to an embodiment, the second feed line 512 may include a third sub-line 5121 connected to the second side 514 to be substantially perpendicular to the second side 514, and a fourth sub-line 5122 extending from the third-sub line 5121 to the second feed pad 5022 in a direction substantially perpendicular to the first edge 5031. For example, the third sub-line 5121 may be connected to substantially the center of the second side 514.

According to various embodiments, the dielectric sheet 500 may include, at the first edge 5031 thereof, first conductive pads 5023 which are disposed on one side and the other side of the first feed pad 5021 with the first feed pad 5021 interposed therebetween and/or second conductive pads 5024 which are disposed on one side and the other side of the second feed pad 5022. According to an embodiment, the first conductive pads 5023 and/or the second conductive pads 5024 may be electrically connected to a ground of the FPCB 590 connected to the dielectric sheet 500, which may help block, for example, the noise of the first feed pad 5021 and the second feed pad 5022 used as signal lines. For example, the first feed pad 5021 and the first conductive pads 5023 may operate as a coplanar waveguide (CPW). As another example, the second feed pad 5022 and the second conductive pads 5024 may operate as a coplanar waveguide (CPW).

Referring to FIG. 5F, a first mesh pattern portion 510" used as an antenna A2 may have a feed structure which is substantially the same as the feed structure of the first mesh pattern portion 510' of FIG. 5E that is connected to the two spaced feed lines 511 and 512. According to an embodiment, the first mesh pattern portion 510" may have a circular shape.

Figure 6A:
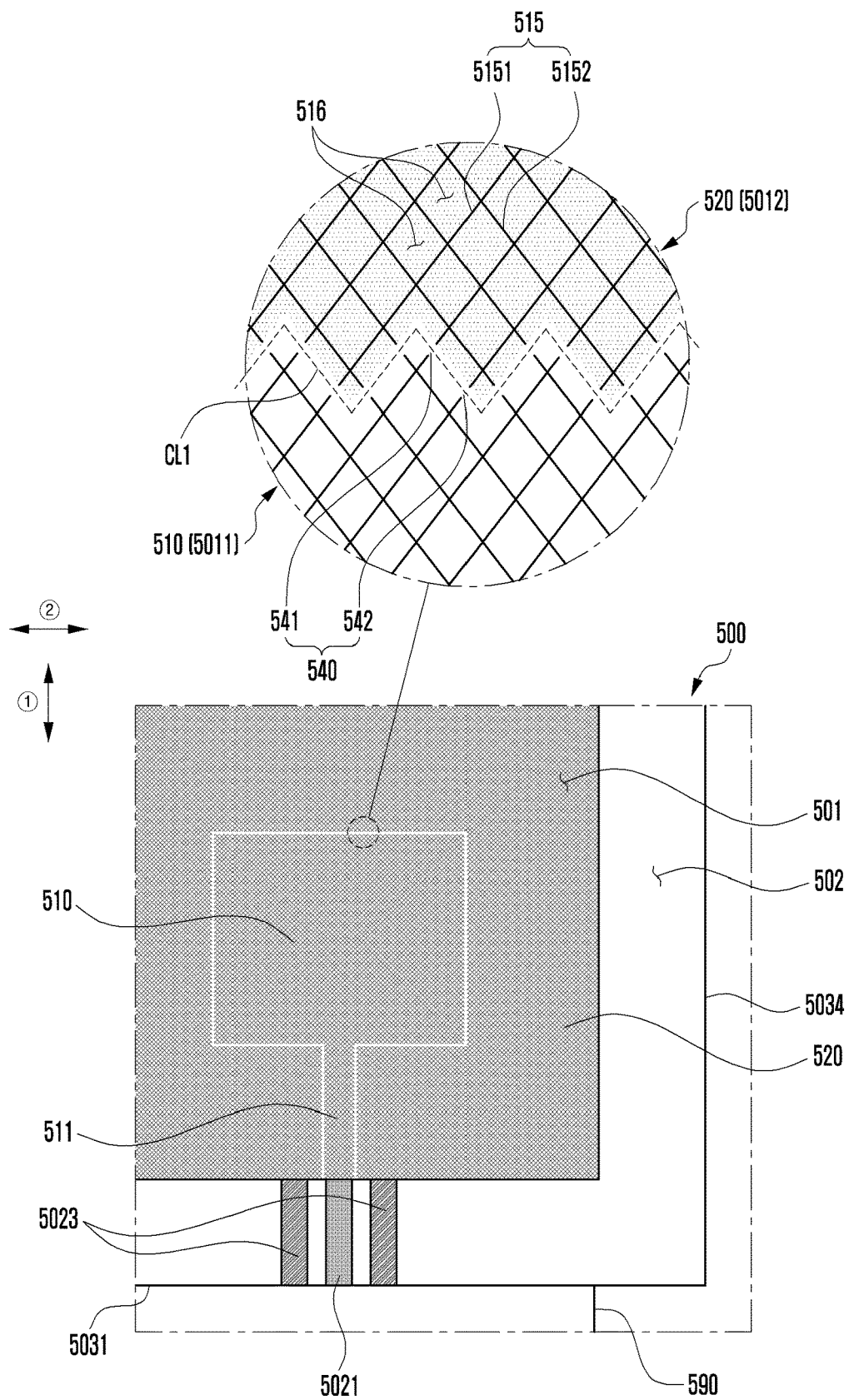
FIGS. 6A and 6B are diagrams each illustrating an example configuration of a portion of a dielectric sheet including a mesh pattern portion according to various embodiments.
Figure 6B:
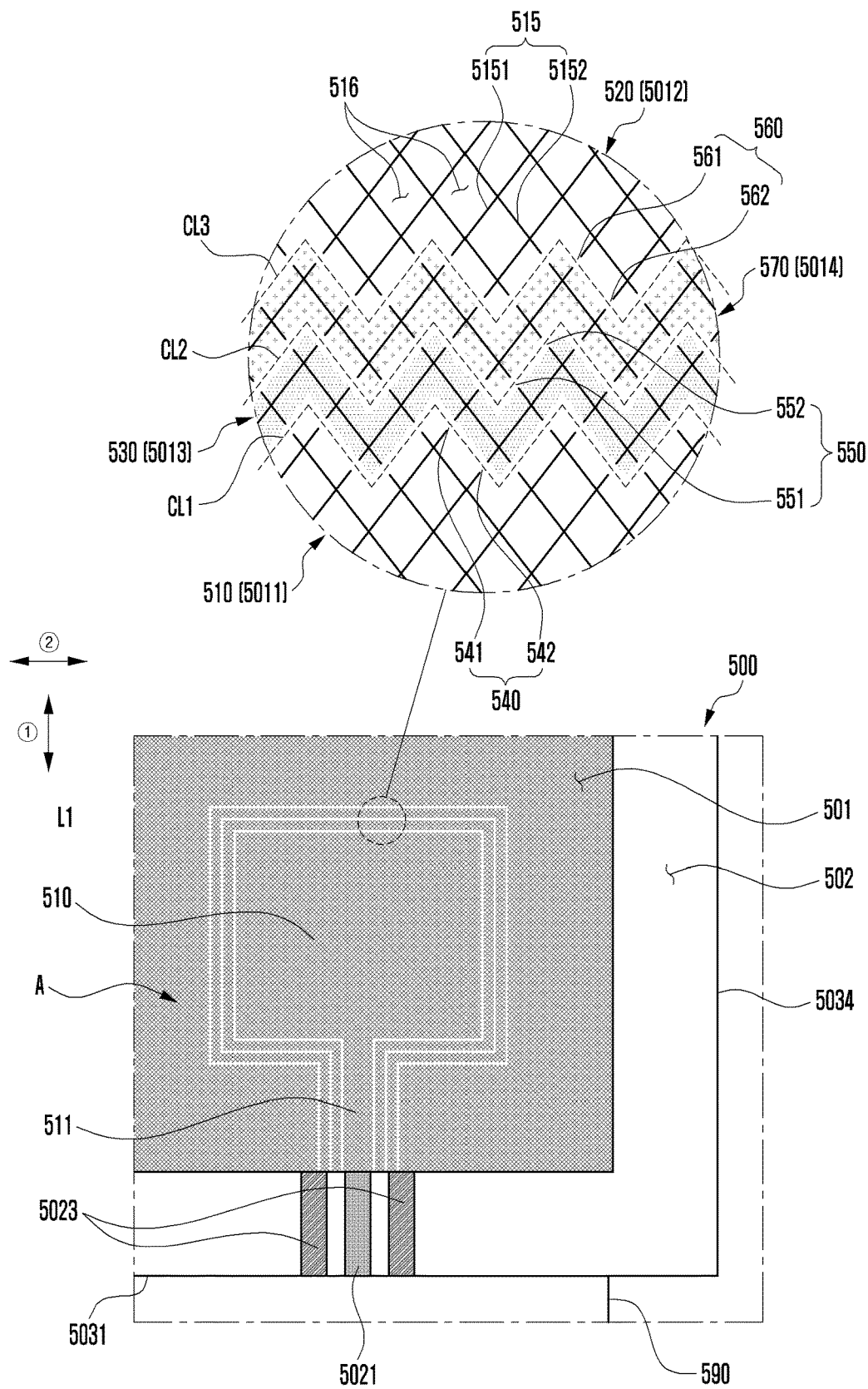
Figure 6C:
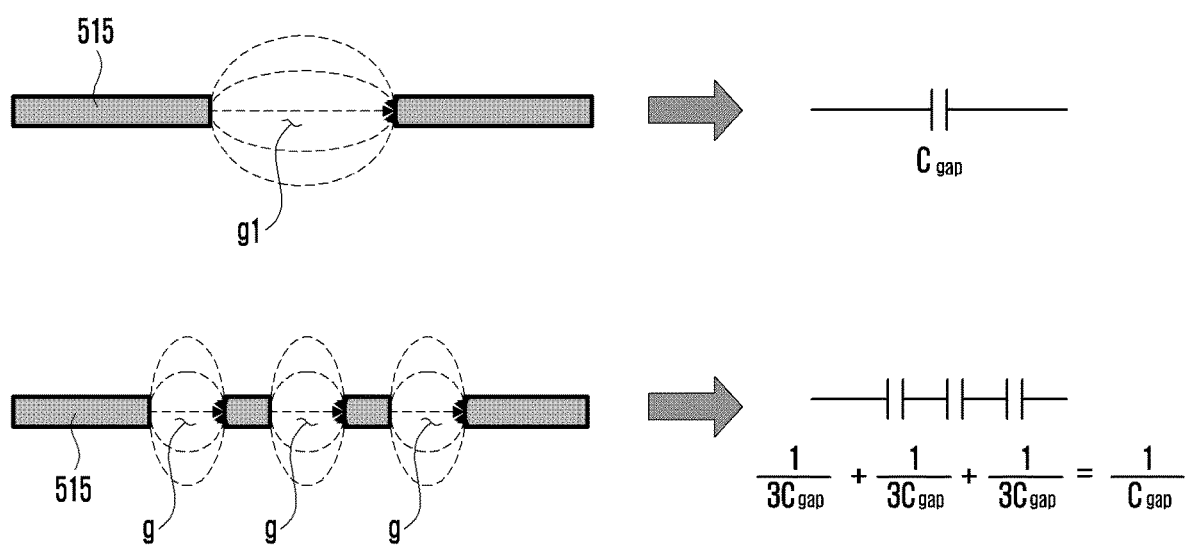
FIG. 6C is a diagram illustrating, in comparison, capacitance changes according to splitting of conductive lines according to various embodiments.

FIGS. 6A and 6B are diagrams each illustrating an example configuration of a portion of a dielectric sheet 500 including a mesh pattern portion according to various embodiments. FIG. 6C is a diagram illustrating, in comparison, capacitance changes according to splitting of conductive lines according to various embodiments.

In describing the dielectric sheet 500 of FIGS. 6A and 6B, substantially the same components as those of the dielectric sheet 500 of FIG. 5C are given the same reference numerals, and detailed descriptions thereof may not be repeated.

Referring to FIG. 6A, in the dielectric sheet 500, the first mesh pattern portion 510 may be arranged to be split from the second mesh pattern 520 by one split line CL1 including the first plurality of split portions 540 without a separate dummy pattern portion. In this case, the plurality of split portions 540 may be disposed in substantially the same manner as those of FIG. 5C described above.

Referring to FIG. 6B, the dielectric sheet 500 may include a first mesh pattern portion 510, a second mesh pattern portion 520, a first dummy pattern portion 530, and a second dummy pattern portion 540 configured with three split lines CL1, CL2, and CL3. According to an embodiment, the three split lines may include a first split line CL1 configured with a first plurality of split portions 540, which is at least partially regularly arranged, a second segmental line CL2 configured with a second plurality of split portions 550, which is irregularly or at least partially regularly arranged, and a third split line CL3 configured with a third plurality of split portions 560, which is irregularly or at least partially regularly arranged. According to an embodiment, for example, the dielectric sheet 500 may include a first mesh pattern portion 510 disposed in a first area 5011 of the conductive mesh structure 510, a second mesh pattern portion 520 disposed in a second area 5012 surrounding at least a portion of the first area 5011, a first dummy pattern portion 530 disposed in a third area 5013 between the first area 5011 and the second area 5012, a second dummy pattern portion 570 disposed in a fourth area 5014 between the second area 5012 and the third area 5013. According to an embodiment, the first mesh pattern portion 510 may be arranged to be split from the second mesh pattern portion 520 by the first dummy pattern portion 530 and the second dummy pattern portion 570.

According to various embodiments, the conductive mesh structures (e.g., the dummy pattern portions 530 and 570 and the second pattern portion 520) around the first mesh pattern portion 510 may be recognized as peripheral conductors having capacitance, and may does cause radiation performance degradation such as gain reduction or pattern distortion of the first mesh pattern portion 510 operating as an antenna. Therefore, the first mesh pattern portion 510 should be spaced apart so as not to interfere with the peripheral conductive mesh structures as much as possible. However, since the first mesh pattern portion may be easily visible as the intervals among the split portions (e.g., the first plurality of split portions 540, the second plurality of split portions 550, and the third plurality of split portions 560 have wider intervals, the separation distance may be limited. In an embodiment, when the split portions for splitting the conductive line 515 are formed in multiple numbers, capacitance due to conductive mesh structures around the first mesh pattern portion 510 may be reduced.

Referring to FIG. 6C, compared to the capacitance when a split portion g1 having a first split width is provided in the conductive line 515, the capacitance when three split portions g having a second split width obtained by dividing the first split width of the conductive line 515 into three equal portions are provided may be relatively reduced. Providing a relatively large number of small split portions in the conductive mesh structures around the first mesh pattern portion 510 may be similar to arranging the first mesh pattern portion 510 to have a relatively great separation distance from peripheral conductive mesh structures, and may help suppress the degradation of radiation performance of the first mesh pattern 510.

Figure 7:
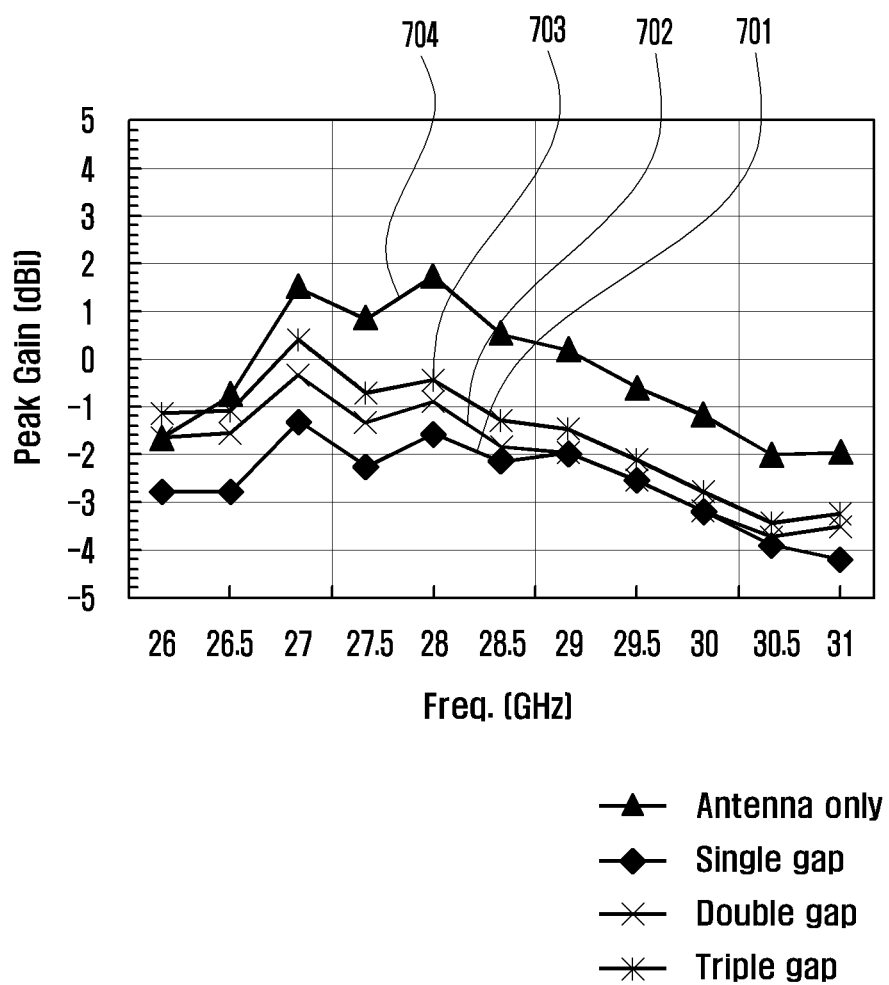
FIG. 7 is a graph illustrating, in comparison, radiation performances of mesh pattern portions depending on the number of split lines according to various embodiments.

FIG. 7 is a graph showing, in comparison, radiation performances of mesh pattern portions depending on the number of split lines according to various embodiments.

Referring to FIGS. 5C to 6B and FIG. 7, it may be seen that the radiation performance (e.g., gain) of the first mesh pattern portion 510 split from the second mesh pattern portion 520 by the first dummy pattern portion 530 in which the first split line CL1 and the second split line CL2 are provided (Graph 702) is improved compared to the radiation performance (e.g., gain) of the first mesh pattern portion 510 split from the second mesh pattern portion 520 only by one split line CL1 (Graph 701). In addition, it may be seen that the radiation performance (e.g., gain) of the first mesh pattern portion 510 split from the second mesh pattern portion 520 by the first dummy pattern 530 and the second dummy pattern 570 configured with the first split line CL1, the second split line CL2, and the third split line CL3 (Graph 703) is improved to be closer to the radiation performance (e.g., gain) when only the first mesh pattern portion 510 is present (Graph 704), compared to the radiation performance (e.g., gain) of the first mesh pattern portion split from the second mesh pattern portion 520 by two split lines CL1 and CL2 (Graph 702).

This may indicate that when the first mesh pattern portion 510 is irregularly or at least partially regularly arranged by a plurality of split portions, it may help suppress the degradation of radiation performance of the antenna.

Figure 8:
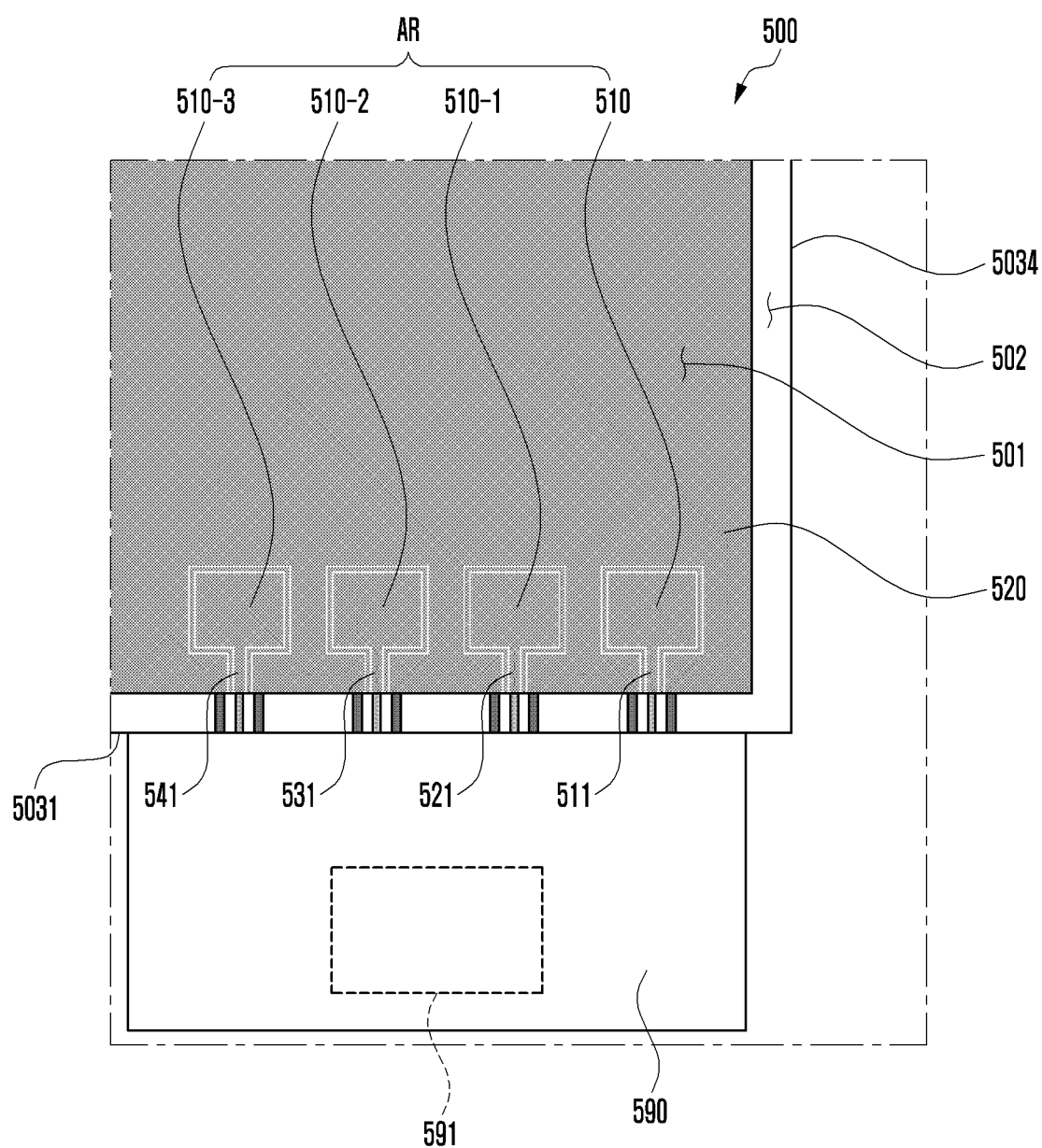
FIG. 8 is a diagram illustrating an example configuration of a portion of a dielectric sheet including a plurality of mesh pattern portions according to various embodiments.

FIG. 8 is a view illustrating a configuration of a portion of a dielectric sheet including a plurality of mesh pattern portions according to various embodiments of the disclosure.

FIG. 8 is a diagram illustrating a configuration of a portion of a dielectric sheet 500 including a plurality of mesh pattern portions 510, 510-1, 510-2, and 510-3 according to various embodiments.

Since each of the plurality of mesh pattern portions 510, 510-1, 510-2, and 510-3 used as an array antenna AR of FIG. 8 has substantially the same electrical connection structure as the first mesh pattern portion 510 provided on the dielectric sheet 500 of FIG. 5C, a detailed description thereof may not be repeated.

Referring to FIG. 8, the dielectric sheet 500 may include an array antenna AR disposed on at least a portion of a conductive mesh structure 501 that at least partially overlaps a display. According to an embodiment, the array antenna AR may include a first mesh pattern portion 510, a second mesh pattern portion 510-1, a third mesh pattern portion 510-2, and/or a fourth mesh pattern 510-3 arranged near a first edge 5031 of the dielectric sheet 500. According to an embodiment, the first mesh pattern portion 510, the second mesh pattern portion 510-1, the third mesh pattern portion 510-2, and/or the fourth mesh pattern portion 510-3 may each have a rectangular shape, and may include feed lines 511, 521, 531, and 541, respectively. According to an embodiment, the first mesh pattern portion 510 may include a first feed line 511 extending from the first mesh pattern portion 510 and electrically connected to the FPCB 590. According to an embodiment, the second mesh pattern portion 510-1 may include a second feed line 521 extending from the second mesh pattern portion 510-1 and electrically connected to the FPCB 590. According to an embodiment, the third mesh pattern portion 510-2 may include a third feed line 531 extending from the third mesh pattern portion 510-2 and electrically connected to the FPCB 590. According to an embodiment, the fourth mesh pattern portion 510-3 may include a fourth feed line 541 extending from the fourth mesh pattern portion 510-3 and electrically connected to the FPCB 590. According to an embodiment, the wireless communication circuit 591 may be configured to transmit and/or receive wireless signals via the first feed line 511, the second feed line 521, the third feed line 531 and/or the fourth feed line 541. In various embodiments, the array antenna AR may include 2, 3, or 5 or more mesh pattern portions arranged on the dielectric sheet 500.

Figure 9A:
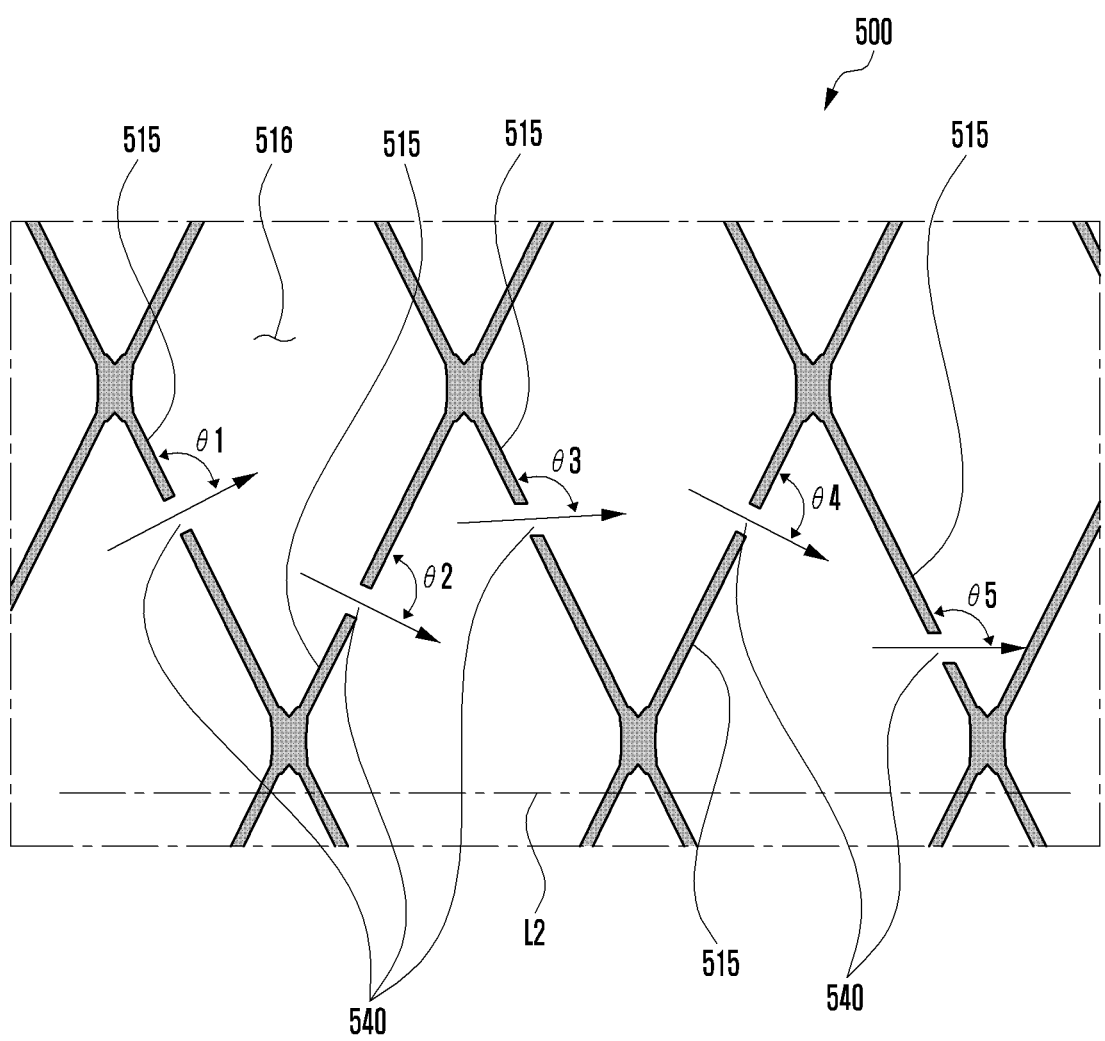
FIGS. 9A and 9B are diagrams each illustrating an example configuration of a portion of a dielectric sheet in which a method of splitting conductive lines is illustrated according to various embodiments.
Figure 9B:
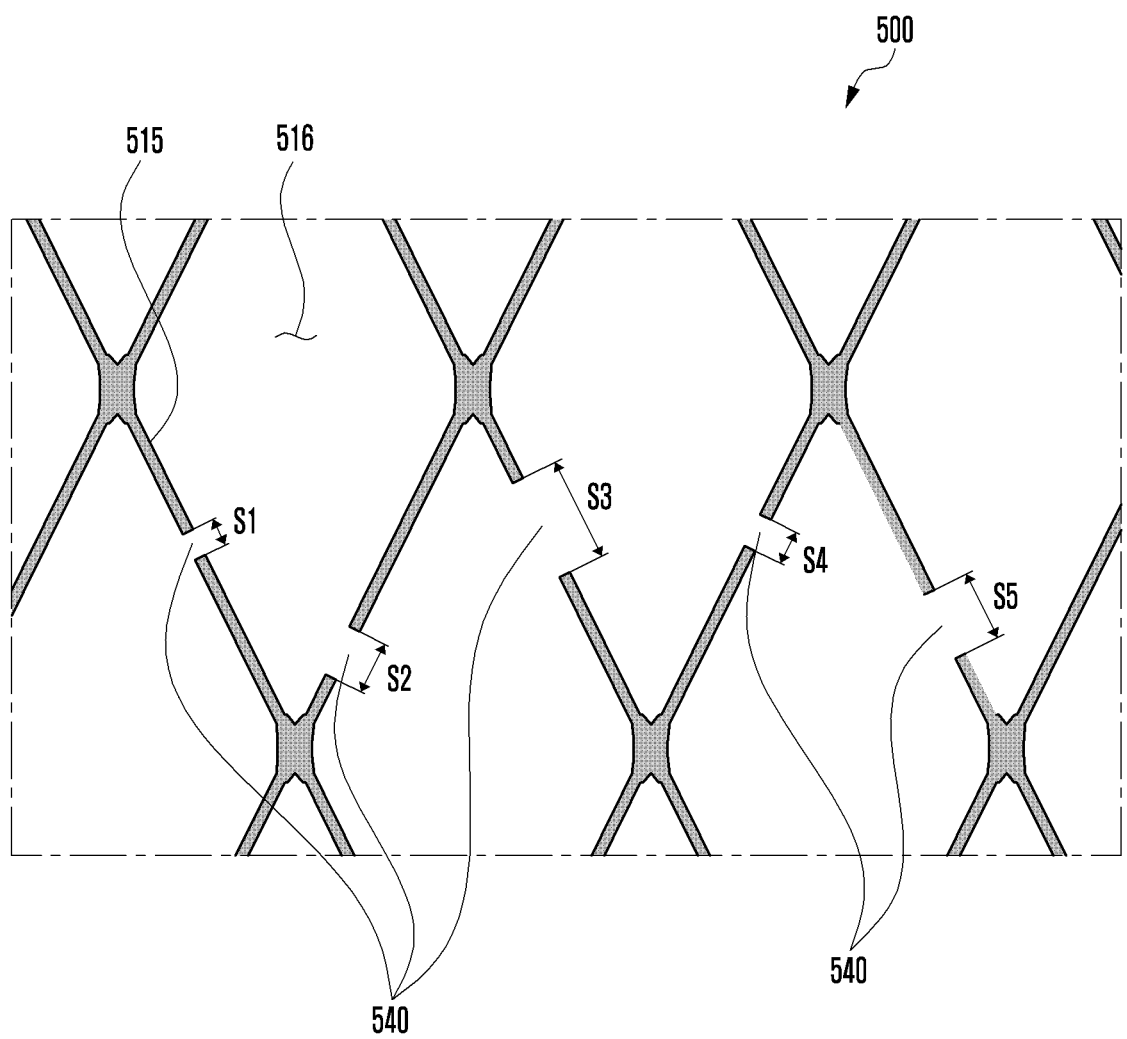

FIGS. 9A and 9B are diagrams each illustrating an example configuration of a portion of a dielectric sheet in which a method of splitting conductive lines is illustrated according to various embodiments.

According to various embodiments, irregularly or at least partially regularly arranged split portions of conductive lines may be provided in various ways to reduce visibility.

Referring to FIG. 9A, at least some of a plurality of split portions (e.g., the split portions 540 or 550 of FIG. 5C) may have different cutting angles. For example, when the plurality of split portions at cutting angles have different angles (θ1, θ2, θ3, θ4, and θ5) from the length direction of the conductive line (e.g., the conductive line 515 of FIG. 5C), the plurality of split portions may help reduce the visibility from the outside. As another example, at least some of the angles θ1, θ2, θ3, θ4, and θ5 may be substantially the same.

Referring to FIG. 9B, at least some of the plurality of split portions may have different cutting widths. For example, when the plurality of split portions have different cutting widths S1, S2, S3, S4, and S5, the plurality of split portions may help reduce visibility from the outside. For example, at least some of the cutting widths S1, S2, S3, S4, or S5 may be substantially the same.

Figure 10:
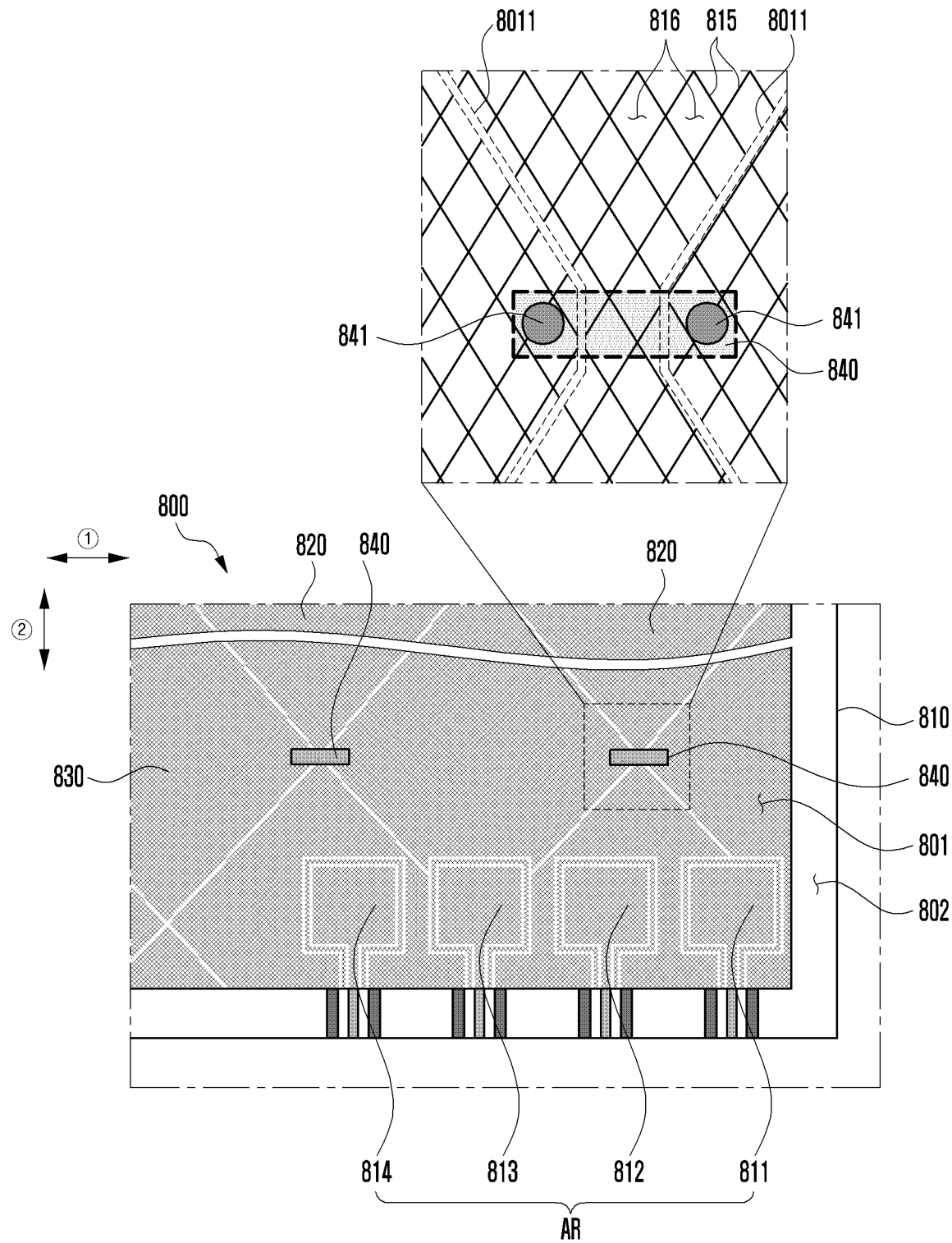
FIG. 10 is a diagram illustrating an example configuration of a touch sensor including an antenna configured with conductive lines according to various embodiments.

FIG. 10 is a diagram illustrating an example configuration of a touch sensor including an antenna AR configured with conductive lines 815 according to various embodiments.

Referring to FIG. 10, a touch sensor 800 may include a dielectric sheet 810 and a plurality of electrode pattern portions 820 and 830 provided on the dielectric sheet 810. According to an embodiment, the dielectric sheet 810 may include a first area 801 and a second area 802 at least partially surrounding the first area 801. According to an embodiment, the first area 801 is an area overlapping an active area (display area) of a display and may include a conductive mesh structure (e.g., the conductive mesh structure 501 of FIG. 5A). According to an embodiment, the second area 802 may include a peripheral area (e.g., the peripheral area 502 of FIG. 5A) overlapping a non-active area (non-display area) of the display.

According to various embodiments, the electrode pattern portions 820 and 830 may be disposed to be split by split portions 8011 provided by cutting at least some of unit patterns 816 (e.g., the unit patterns 516 of FIG. 5C) configured with a plurality of conductive lines 815 (e.g., the conductive lines 515 of FIG. 5C) in the first area 801 of the dielectric sheet 810. According to an embodiment, the plurality of electrode pattern portions 820 and 830 may include first electrode pattern portions 820 arranged at predetermined intervals along a first direction (direction (1)), and second electrode pattern portions 830 arranged at predetermined intervals along a second direction (direction (2) intersecting the first direction, in which each of the second electrode pattern portions 830 is disposed between adjacent first electrode pattern portions 820. According to an embodiment, at least some of the second electrode pattern portions 830 arranged along the second direction may be electrically connected to each other via conductive bridges 840 and conductive vias 841. According to an embodiment, the touch sensor 800 may include a capacitive touch sensor. According to an embodiment, the first electrode pattern portions 820 and the second electrode pattern portions 830 may be electrically connected to a wiring structure disposed in the second area 802 of the dielectric sheet 810, and the wiring structure may be electrically connected to a printed circuit board (e.g., the printed circuit board 340 of FIG. 3C) of an electronic device via an FPCB. According to an embodiment, the FPCB may include a touch display driver IC (TDDI). According to an embodiment, respective unit patterns of the electrode patterns 820 and 830 may be arranged to be split from each other by split portions 8011 which are regularly split. In various embodiments, the unit patterns of the electrode patterns 820 and 830 may be arranged to be split from each other by at least some of irregularly or at least partially regularly arranged split portions 540, 550, and 560 described above with reference to FIGS. 5C to 6B. In an embodiment, the first electrode pattern portions 820 or the second electrode pattern portions 830 may be split using at least one of the first split line CL1, the second split line CL2, or the third split line CL3. For example, at least some of the first electrode pattern portions 820 or the second electrode pattern portions 830 may be split using one split line, such as the first split line CL1 of FIG. 6A. As another example, at least some of the first electrode pattern portions 820 or the second electrode pattern portions 830 may be split using two split lines such as the first split line CL1 and the second split line CL2, as illustrated in FIG. 5C. As another example, at least some of the first electrode pattern portions 820 or the second electrode pattern portions 830 may be split using three split lines such as the first split line CL1, the second split line CL2, and the third split line CL3 as illustrated in FIG. 6B.

According to various embodiments, the touch sensor 800 may include an array antenna AR disposed on at least a portion of the first area 801 of the dielectric sheet 810. According to an embodiment, the array antenna AR may include a first mesh pattern portion 811, a second mesh pattern portion 812, a third mesh pattern portion 813, and/or a fourth mesh pattern portion 814. The first mesh pattern portion 811, the second mesh pattern portion 812, the third mesh pattern portion 813, and/or the fourth mesh pattern portion 814 may have substantially the same electrical wiring structure as the first mesh pattern portion 510 of FIG. 5C. According to an embodiment, the first mesh pattern portion 811, the second mesh pattern portion 812, the third mesh pattern portion 813, and/or the fourth mesh pattern portion 814 may be arranged to be split from a peripheral conductive mesh structure (e.g., the electrode pattern portions 820 and 830 for a touch sensor) by a plurality of split portions (e.g., the split portions 540, 550, or 560 of FIG. 6B) provided by cutting at least some of the plurality of conductive lines 815. In various embodiments, the array antenna AR may be replaced with one mesh pattern portion (e.g., the mesh pattern portion 510 of FIG. 5C). According to an embodiment, the size of the first mesh pattern portion 811, the second mesh pattern portion 812, the third mesh pattern portion 813, and/or the fourth mesh pattern portion 814 may be smaller than that of the electrode pattern portions 820 and 830 for the touch sensor so that touch operation may not be affected. In various embodiments, the size of the first mesh pattern portion 811, the second mesh pattern portion 812, the third mesh pattern portion 813, and/or the fourth mesh pattern portion 814 may be greater than that of the electrode pattern portions 820 and 830 for the touch sensor. In various embodiments, the shape of unit patterns configuring the first mesh pattern portion 811, the second mesh pattern portion 812, the third mesh pattern portion 813, and/or the fourth mesh pattern portion 814 may be different from the shape of the unit pattern configuring the electrode pattern portions 820 and 830 for the touch sensor.

Figure 11A:
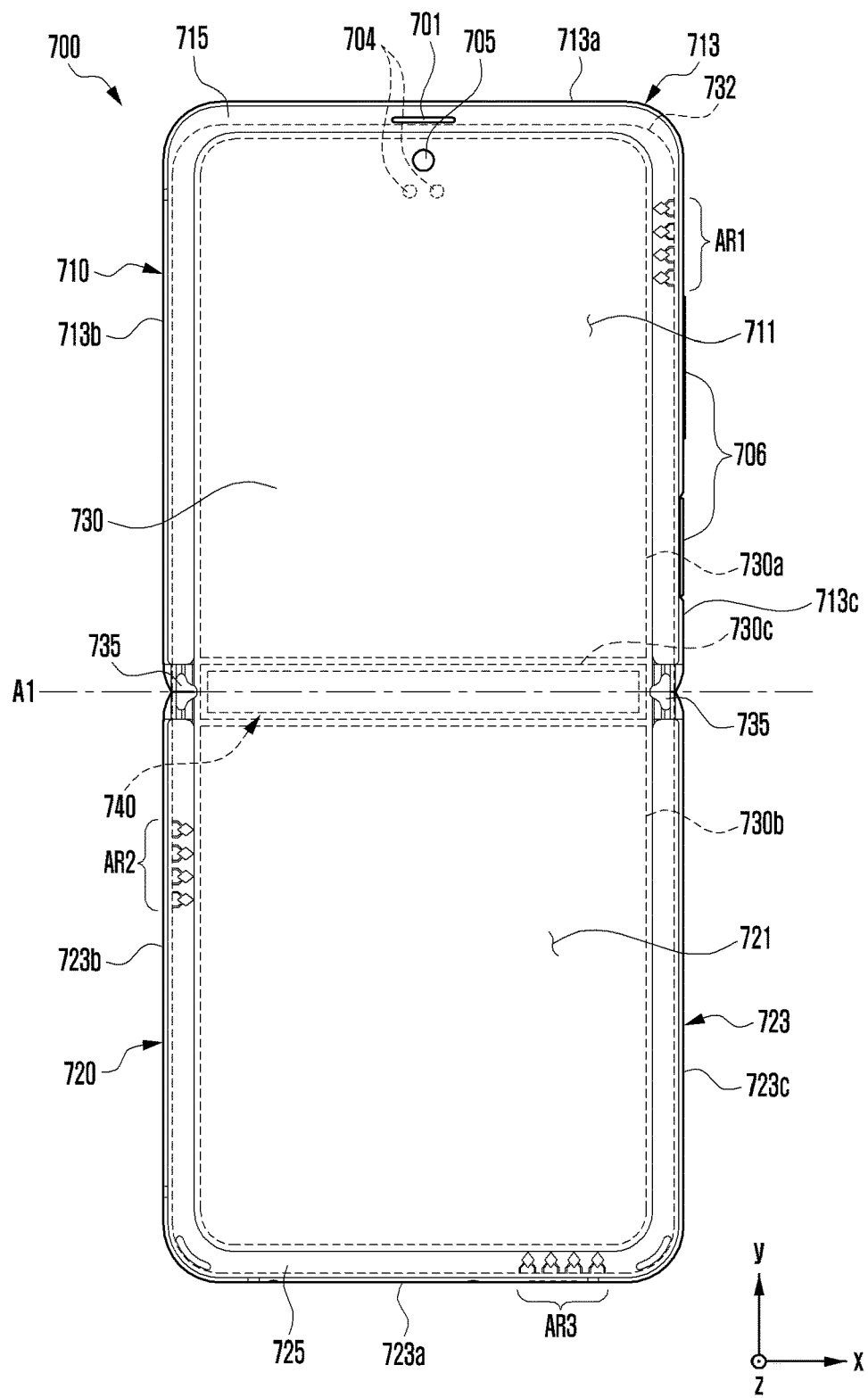
FIGS. 11A and 11B are diagrams respectively illustrating front and rear surfaces of an electronic device (e.g., a foldable electronic device) according to various embodiments.
Figure 11B:
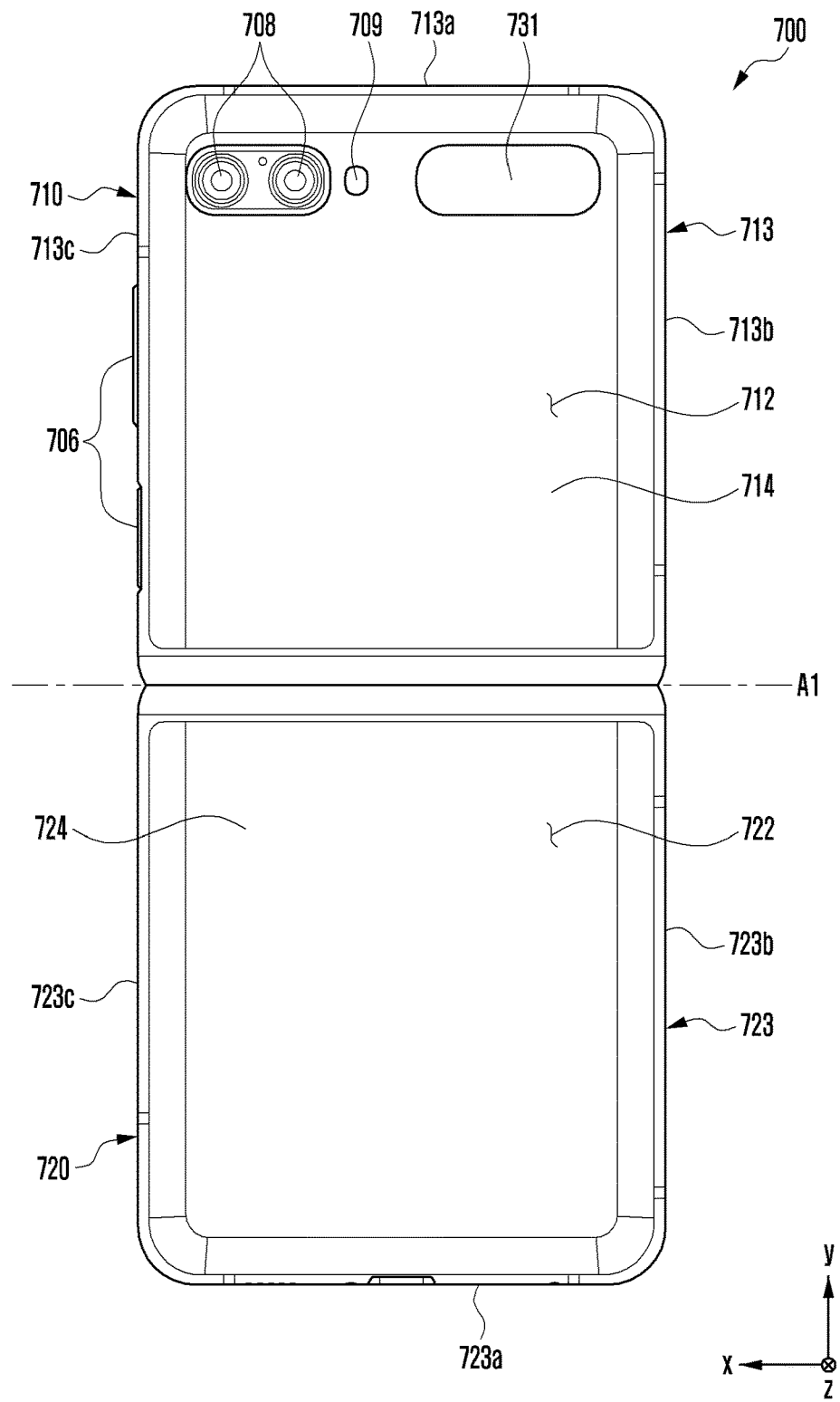

FIGS. 11A and 11B are diagrams respectively illustrating front and rear surfaces of an electronic device (e.g., a foldable electronic device) according to various embodiments.

Referring to FIGS. 11A and 11B, an electronic device 700 may include housings 710 and 720 (e.g., foldable housings), which are coupled to be rotatable about a hinge module 740 so as to be folded while facing each other. In various embodiments, the hinge module 740 may be arranged in the x-axis direction or in the y-axis direction. In various embodiments, two or more hinge modules 740 may be arranged to be folded in the same direction or in different directions. According to an embodiment, the electronic device 700 may include a flexible display 730 (e.g., a foldable display) disposed in an area defined by the housings 710 and 720. According to an embodiment, the first housing 710 and the second housing 720 may be disposed on opposite sides of a folding axis (axis A1) and may have substantially symmetrical shapes with respect to the folding axis (axis A1). According to an embodiment, the first housing 710 and the second housing 720 may form an angle or a distance therebetween, which may be variable depending on whether the electronic device 700 is in an unfolded or flat state, in a folded state, or in an intermediate state.

According to various embodiments, the housings 710 and 720 may include a first housing 710 (e.g., a first housing structure) coupled to the hinge module 740, and a second housing 720 (e.g., a second housing structure) coupled to the hinge module 740. According to an embodiment, in the unfolded state, the first housing 710 may include a first surface 711 oriented in a first direction (e.g., the front direction) (the z-axis direction) and a second surface 712 oriented in a second direction (e.g., the rear direction) (the -z-axis direction) opposite the first surface 711. According to an embodiment, the second housing 720 may include, in the unfolded state, a third surface 721 oriented in the first direction (the z-axis direction) and a fourth surface 722 oriented in the second direction (the -z-axis direction). According to an embodiment, the electronic device 700 may be operated such that, in the unfolded state, the first surface 711 of the first housing 710 and the third surface 721 of the second housing 720 are oriented in substantially the same direction, e.g., the first direction (the z-axis direction) and in the folded state, the first surface 711 and the third surface 721 face each other. According to an embodiment, the electronic device 700 may be operated such that, in the unfolded state, the second surface 712 of the first housing 710 and the fourth surface 722 of the second housing 720 are oriented in substantially the same direction, e.g., the second direction (the -z-axis direction) and in the folded state, the second surface 712 and the fourth surface 722 face away from each other. For example, in the folded state, the second surface 712 may be oriented in the first direction (the z-axis direction), and the fourth surface 722 may be oriented in the second direction (the -z-axis direction).

According to various embodiments, the first housing 710 may include a first side surface member 713 defining at least a portion of the exterior of the electronic device 700, and a first rear surface cover 714 coupled to the first side surface member 713 and defining at least a portion of the second surface 712 of the electronic device 700. According to an embodiment, the first side surface member 713 may include a first side surface 713*a*, a second side surface 713*b* extending from one end of the first side surface 713*a*, and a third side surface 713*c* extending from the other end of the first side surface 713*a*. According to an embodiment, the first side surface member 713 may have a rectangular (e.g., square or oblong) shape configured with the first side surface 713*a*, the second side surface 713*b*, and the third side surface 713*c*.

According to various embodiments, the second housing 720 may include a second side surface member 723 at least partially defining the exterior of the electronic device 700, and a second rear surface cover 724 coupled to the second side surface member 723 and at least partially defining the fourth surface 722 of the electronic device 700. According to an embodiment, the second side surface member 723 may include a fourth side surface 723*a*, a fifth side surface 723*b* extending from one end of the fourth side surface 723*a*, and a sixth side surface 723*c* extending from the other end of the fourth side surface 723*a*. According to an embodiment, the second side surface member 723 may have a rectangular shape configured with the fourth side surface 723*a*, the fifth side surface 723*b*, and the sixth side surface 723*c*.

According to various embodiments, the housings 710 and 720 are not limited to the illustrated shape and assembly, but may be implemented by other shapes or other combinations and/or assemblies of components. For example, in various embodiments, the first side member 713 may be configured integrally with the first rear cover 714. As another example, the second side member 723 may be configured integrally with the second rear cover 724.

According to various embodiments, in the unfolded state of the electronic device 700, the second side surface 713*b* of the first side member 713 and the fifth side surface 723b of the second side member 723 may form one imaginary line. According to an embodiment, in the unfolded state of the electronic device 700, the third side surface 713c of the first side member 713 and the sixth side surface 723c of the second side member 723 may form one imaginary line. According to an embodiment, the electronic device 700 may be configured such that, in the unfolded state, the total length of the second side surface 713b and the fifth side surface 723b is longer than the length of the first side surface 713a and/or the fourth side surface 723a. As another example, the total length of the third side surface 713c and the sixth side surface 723c may be greater than the length of the first side surface 713a and/or the fourth side surface 723a. According to an embodiment, the first side member 713 and/or the second side member 723 may include a conductive member such as metal or a non-conductive member such as polymer or ceramic.

According to various embodiments, the first side member 713 and/or the second side member 723 may include one or more conductive portions (not illustrated) physically split by at least one split portion (not illustrated) filled with a non-conductive member such as polymer or ceramic. In this case, the at least one conductive portion (not illustrated) may be used as an antenna operating in at least one predetermined band (e.g., a legacy band) by being electrically connected to a wireless communication circuit included in the electronic device 700.

According to various embodiments, the first rear surface cover 714 and/or the second rear surface cover 724 may be made of at least one of, for example, coated or colored glass, ceramic, polymer, or metal (e.g., aluminum, stainless steel (STS), or magnesium), or a combination of at least two of these materials.

According to various embodiments, the flexible display 730 may be disposed to extend from the first surface 711 of the first housing 710 to at least a portion of the third surface 721 of the second housing 720 across the hinge module 740. For example, the flexible display 730 may include a first area 730a substantially corresponding to the first surface 711, a second area 730b corresponding to the second surface 721, and a third area 730c interconnecting the first area 730a and the second area 730b and corresponding to the hinge module 740. The third area 730c may be curved or unfolded according to the operation of the first housing 710 or the second housing 720. According to an embodiment, the electronic device 700 may include a first protective cover 715 (e.g., a first protective frame or a first decorative member) coupled along the periphery of the first housing 710. According to an embodiment, the electronic device 700 may include a second protective cover 725 (e.g., a second protective frame or a second decorative member) coupled along the periphery of the second housing 720. According to an embodiment, the first protective cover 715 and/or the second protective cover 725 may be made of a metal or polymer material. According to an embodiment, the first protective cover 715 and/or the second protective cover 725 may be used as a decoration member. According to an embodiment, the flexible display 730 may be located such that the periphery of the first flat area 730a is interposed between the first housing 710 and the first protective cover 715. According to an embodiment, the flexible display 730 may be located such that the periphery of the second flat area 730b is interposed between the second housing 720 and the second protective cover 725. According to an embodiment, the flexible display 730 may be located such that the edge of the flexible display 730 corresponding to the hinge module 740 is protected by a protective cap 735 disposed on an area corresponding to the hinge module 740. Accordingly, the periphery of the flexible display 730 may be protected from the outside while being substantially invisible. According to an embodiment, the electronic device 700 may include a hinge housing (not illustrated) configured to support the hinge module 740, wherein the hinge housing is arranged to be exposed to the outside when the electronic device 700 is in the folded state and to be invisible from the outside by being drawn into a first space (e.g., the inner space of the first housing 710) and a second space (e.g., the inner space of the second housing 720) when the electronic device 700 is in the unfolded state. In various embodiments, when the electronic device 700 is in a folded state, the second surface 712 and the fourth surface 722 may operate to face each other so that the flexible display 730 is visually recognized from the outside. In the case of out-folding type, the first array antenna AR1 and the second array antenna AR2 may form beam patterns in opposite directions.

According to various embodiments, the electronic device 700 may include a sub-display 731 disposed separately from the flexible display 730. According to an embodiment, the sub-display 731 may be disposed to be at least partially exposed to the second surface 712 of the first housing 710 or the fourth surface 722 of the second housing 720. For example, in the folded state, the sub-display 731 may display state information of the electronic device 700 or various contents such as time, image, or application. According to an embodiment, the sub-display 731 may be disposed to be visible from the outside through at least a partial area of the first rear surface cover 714. In various embodiments, the sub-display 731 may be disposed on the fourth surface 722 of the second housing 720. In this case, the sub-display 731 may be disposed to be visible from the outside through at least a partial area of the second rear cover 724. As another example, the size of the sub display 731 may not be limited to that illustrated in FIG. 11B. For example, the size of the sub-display 731 may be substantially the same as that of the second surface 712.

According to various embodiments, the electronic device 700 may include at least one of an input device 703 (e.g., a microphone), sound output devices 701 and 702, a sensor module 704, camera devices 705 and 708, key input devices 706, or a connector port 707. In the illustrated embodiment, the input device 703 (e.g., a microphone), the sound output devices 701 and 702, the sensor module 704, the camera devices 705 and 708, the key input devices 706, or the connector port 707 are indicated as holes or shapes provided in the first housing 710 or the second housing 720, but may be defined as including practical electronic components (e.g., an input device, a sound output device, a sensor module, or a camera device) disposed inside the electronic device 700 and operating through the holes or shapes.

According to various embodiments, the input device 703 may include at least one microphone disposed in the second housing 720. In various embodiments, the input device 703 may include a plurality of microphones arranged to detect the direction of sound. In various embodiments, the plurality of microphones may be disposed at appropriate positions in the first housing 710 and/or the second housing 720. According to an embodiment, the sound output devices 701 and 702 may include speakers. According to an embodiment, the speakers may include a phone call receiver 701 disposed in the first housing 710 and a speaker 702 disposed in the second housing 720. In vrious embodiments, the input device 703, the sound output devices 701 and 702, and/or the connector port 707 may be disposed in a space provided in the first housing 710 and/or a space provided in the second housing 720 of the electronic device 700, and may be exposed to the external environment through one or more holes provided in the first housing 710 and/or the second housing 720. According to an embodiment, at least one connector port 707 may be used to transmit/receive power and/or data to/from an external electronic device. In various embodiments, the at least one connector port 707 (e.g., an ear jack hole) may accommodate a connector (e.g., an ear jack) for transmitting/receiving an audio signal with respect to an external electronic device. In various embodiments, the holes provided in the first housing 710 and/or the second housing 720 may be commonly used for the input device 703 and the sound output devices 701 and 702. In various embodiments, the sound output devices 701 and 702 may include a speaker that operates without holes provided in the first housing 710 and/or the second housing 720 (e.g., a piezo speaker).

According to various embodiments, the sensor module 704 may generate electrical signals or data values corresponding to the internal operating state of the electronic device 700 or an external environmental state. The sensor module 704 may detect an external environment through, for example, the first surface 711 of the first housing 710. In various embodiments, the electronic device 700 may further include at least one sensor module disposed to detect an external environment through the second surface 712 of the first housing 710. According to an embodiment, the sensor module 704 (e.g., an illuminance sensor) may be disposed under the flexible display 730 to detect an external environment through the flexible display 730. According to an embodiment, the sensor module 704 may include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor 704.

According to various embodiments, the camera devices 705 and 708 may include a first camera device 705 disposed on the first surface 711 of the first housing 710 (e.g., a front camera device) and/or a second camera device 708 disposed on the second surface 712 of the first housing 710. The electronic device 700 may further include a flash 709 disposed near the second camera device 708. According to an embodiment, the camera devices 705 and 708 may each include one or more lenses, an image sensor, and/or an image signal processor. The flash 709 may include, for example, a light-emitting diode or a xenon lamp. According to an embodiment, the camera devices 705 and 708 may be arranged such that two or more lenses (e.g., a wide-angle lens, an ultra-wide-angle lens, or a telephoto lens) and image sensors are located on one surface (e.g., the first surface 711, the second surface 712, the third surface 721, or the fourth surface 722) of the electronic device 700. In various embodiments, the camera devices 705 and 708 may each include time-of-flight (TOF) lenses and/or an image sensor.

According to various embodiments, the key input devices 706 (e.g., key buttons) may be disposed on the third side surface 713c of the first side surface member 713 of the first housing 710. In various embodiments, the key input devices 706 may be disposed on at least one of the other side surfaces 713a and 713b of the first housing 710 and/or the side surfaces 723a, 723b, and 723c of the second housing 720. In various embodiments, the electronic device 700 may not include some or all of the key input devices 706, and key input devices 706 not included in the electronic device 700 may be implemented in another form such as touch keys or soft keys on the flexible display 730. In various embodiments, the key input devices 706 may be implemented using pressure sensors included in the flexible display 730.

According to various embodiments, some of the camera devices 705 and 708 (e.g., the first camera device 705) or the sensor module 704 may be disposed to be exposed through the flexible display 730. For example, the first camera device 705 or the sensor module 704 may be disposed in the inner space of the electronic device 700 to be in contact with the external environment through an opening (e.g., a through hole) at least partially provided in the flexible display 730. As an embodiment, some sensor modules 704 may be disposed to perform the functions thereof in the inner space of the electronic device 700 without being visually exposed through the flexible display 730. For example, in this case, the opening in the area facing the sensor module of the flexible display 730 may not be necessary. As another example, a position corresponding to the sensor module 704 and/or the camera devices 705 and 708 may be configured to have higher transmittance than the peripheral area without an opening in the flexible display 730. In this case, the area of the flexible display 730 corresponding to the sensor module 704 and/or the camera devices 705 and 708 may be configured such that pixels and/or a wiring structure are omitted therefrom or the area have a lower pixel density and/or wiring density than the peripheral area.

According to various embodiments, the electronic device 700 may include a dielectric sheet 732 disposed to at least partially overlap the flexible display 730. According to an embodiment, the dielectric sheet 732 may include at least one array antenna AR1, AR2, or AR3 (e.g., the array antenna AR of FIG. 8) disposed in at least a partial area. For example, the at least one array antenna AR1, AR2, or AR3 may include a first array antenna AR1, a second array antenna AR2, and/or a third array antenna AR3. According to an embodiment, the at least one array antenna AR1, AR2, or AR3 may include, on the dielectric sheet 732, a first array antenna AR1 disposed in an area overlapping the first housing 710 when the flexible display 730 is viewed from above, and a second array antenna AR2 and a third array antenna AR3 disposed in an area overlapping the second housing 720 when the flexible display 730 is viewed from above. According to an embodiment, when the flexible display 730 is viewed from above, the first array antenna AR1 may be disposed at a position overlapping the first protective cover 715 disposed on the first housing 710. In this case, when the flexible display 730 is viewed from above, an area of the first protective cover 715 overlapping the first array antenna AR1 may include a non-conductive material (e.g., a polymer material). In various embodiments, the first array antenna AR1 may be disposed at a position overlapping the first flat area 730a of the flexible display 730 when the flexible display 730 is viewed from above. According to an embodiment, when the flexible display 730 is viewed from above, the second array antenna AR2 and/or the third array antenna AR3 may be disposed at a position overlapping a second protective cover 725 disposed on the second housing 720. In this case, when the flexible display 730 is viewed from above, an area of the second protective cover 725 overlapping the second array antenna AR2 or the third array antenna AR3 may include a non-conductive material (e.g., a polymer material). In various embodiments, the second array antenna AR2 and/or the third array antenna AR3 may be disposed at a position overlapping the second flat area 730b of the flexible display 730 when the flexible display 730 is viewed from above. In various embodiments, the at least one array antenna AR1, AR2, or AR3 may be disposed at a position overlapping the bendable area 730c when the flexible display 730 is viewed from above. In this case, the dielectric sheet 732 may be made of a bendable material. According to an embodiment, the first array antenna AR1, the second array antenna AR2, and/or the third array antenna AR3 may form beam patterns in a direction in which the flexible display 730 is oriented when the electronic device 700 is in the unfolded state. In various embodiments, the first array antenna AR1, the second array antenna AR2, and/or the third array antenna AR3 may be disposed on the dielectric sheet 732, and may be replaced with one mesh pattern portion (e.g., the mesh pattern portion 510 of FIG. 5C) configured with multiple split lines (e.g., the split lines CL1 and CL2 of FIG. 5C) to be distinguished from a peripheral mesh pattern portion.

Figure 12A:
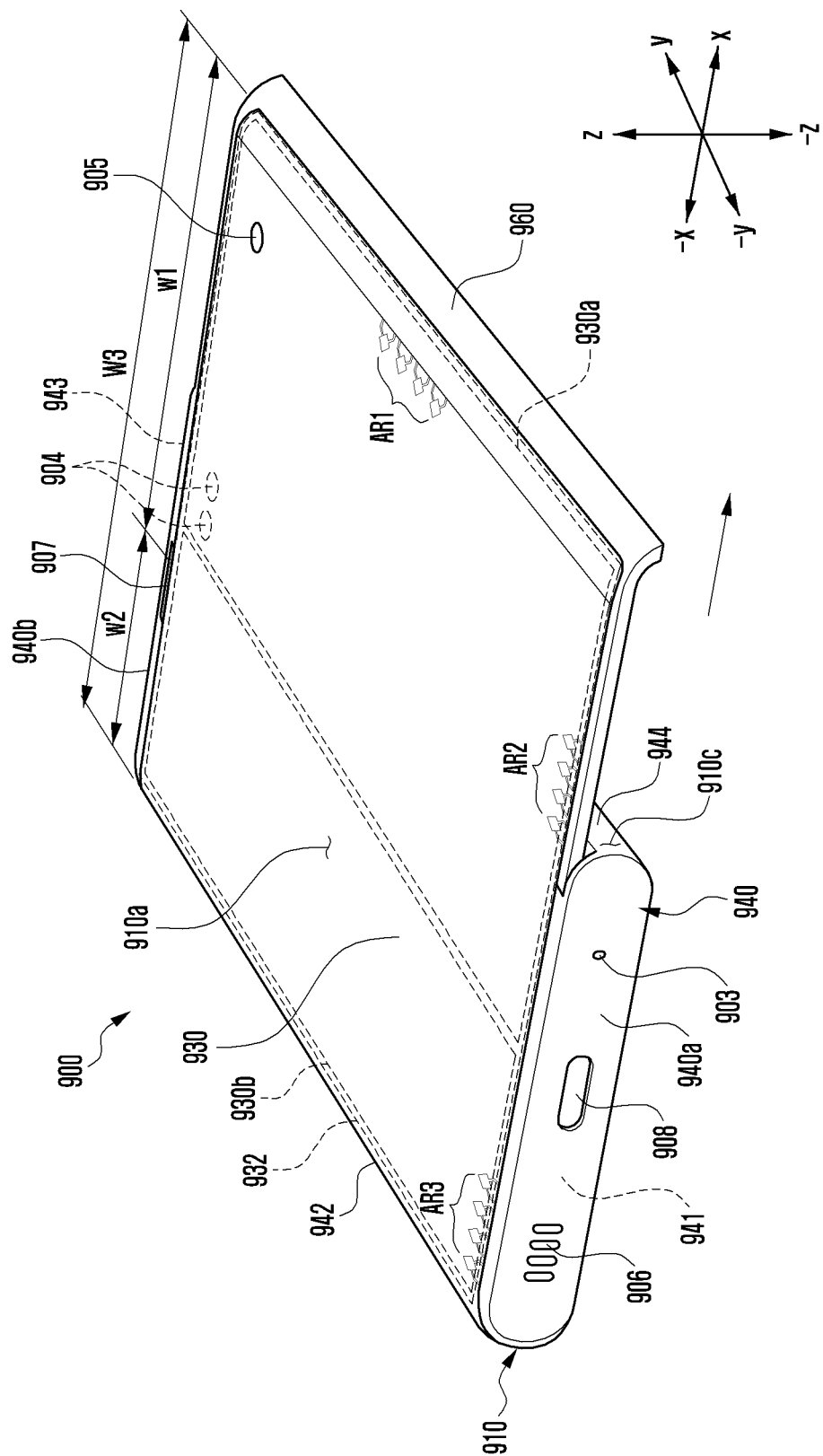
FIGS. 12A and 12B are perspective views respectively illustrating configurations of front and rear surfaces of an electronic device (e.g., a slidable electronic device) according to various embodiments.
Figure 12B:
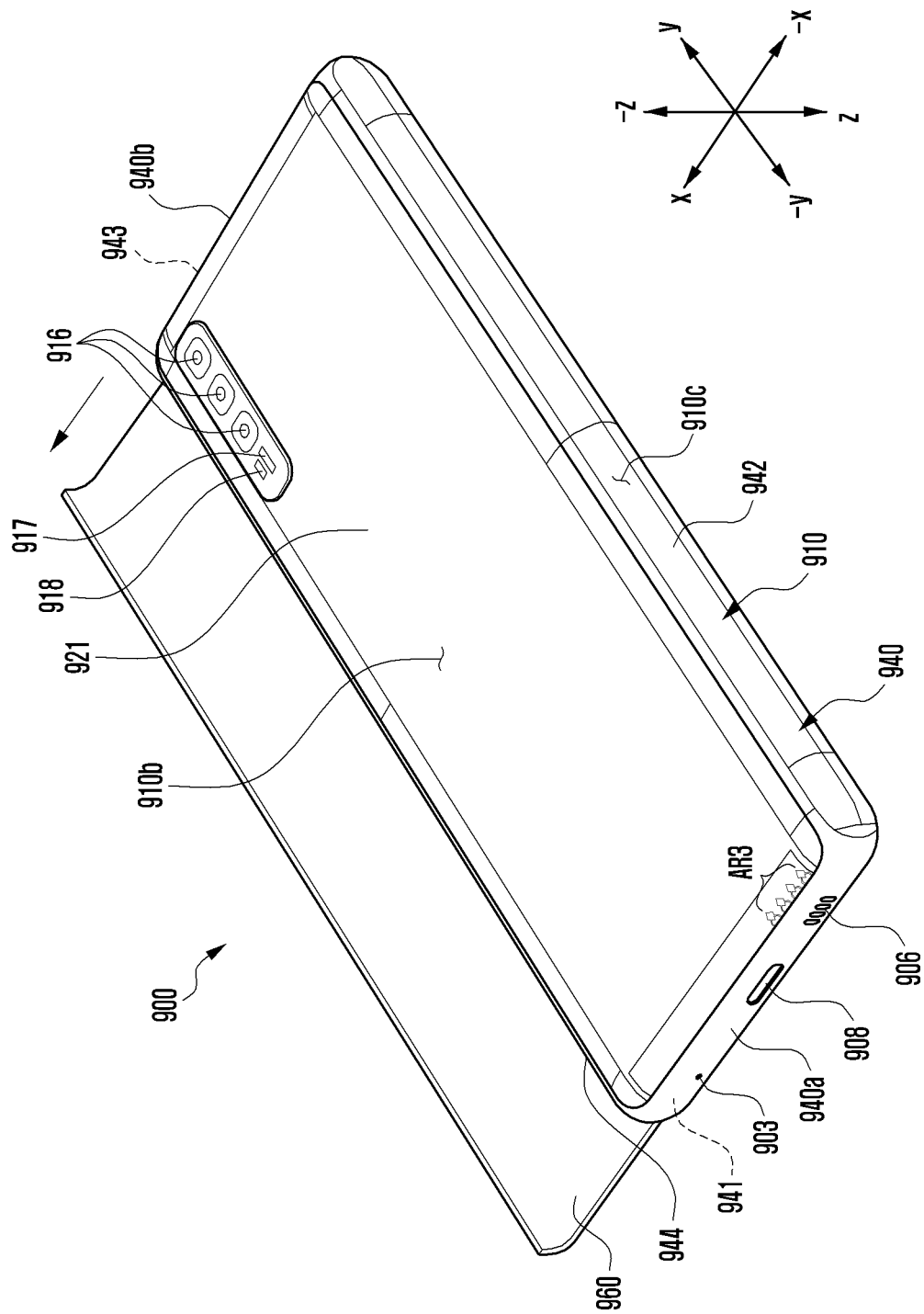

FIGS. 12A and 12B are diagrams respectively illustrating front and rear surfaces of an electronic device (e.g., a slidable electronic device or a rollable electronic device) according to various embodiments.

Referring to FIGS. 12A and 12B, the electronic device 900 may include a housing 910 (e.g., a housing structure), and a slide plate 960 (e.g., a slide structure) coupled to be at least partially movable from the housing 910 and configured to support at least a portion of a flexible display 930. According to an embodiment, the slide plate 960 may include a bendable hinge rail (not illustrated) (e.g., an articulated hinge or a multi-bar assembly) coupled to one end thereof and configured to support at least a portion of the flexible display 930. For example, when the slide plate 960 performs a sliding operation in the housing 910, the hinge rail may be at least partially slid into the inner space of the housing 910 while supporting the flexible display 930. According to an embodiment, the electronic device 900 may include a housing 910 (e.g., a housing structure) that includes a front surface 910a (e.g., a first surface) oriented in a first direction (e.g., the z-axis direction), a rear surface 910b (e.g., a second surface) oriented in a second direction (e.g., the -z-axis direction) opposite to the first direction, and a side surface member 940 surrounding a space between the front surface 910a and the rear surface 910b and including a side surface 910c at least partially exposed to the outside. According to an embodiment, the rear surface 910b may be defined by a rear surface cover 921 coupled to the housing 910. According to an embodiment, the rear surface cover 921 may be made of, for example, polymer, coated or colored glass, ceramic, metal (e.g., aluminum, stainless steel (STS), or magnesium), or a combination of two or more of these materials. In various embodiments, the rear surface 921 may be configured integrally with the housing 910. According to an embodiment, at least a portion of the side surface 910c may be disposed to be exposed to the outside through the housing 910. According to an embodiment, at least a portion of the slide plate 960 may define at least a portion of the side surface 910c together with the fourth side surface 944.

According to an embodiment, the side surface 940 may include a first side surface 941 having a first length, a second side surface 942 extending from the first side surface 941 in a direction perpendicular to the first side surface 941 and having a second length greater than the first length, a third side surface 943 extending from the second side surface 942 to be parallel to the first side surface 941 and having the first length, and a fourth side surface 944 extending from the third side surface 943 to be parallel to the second side surface 942 and having the second length. According to an embodiment, the slide plate 960 supports the flexible display 930 and may slide out from the second side surface 942 toward the fourth side surface 944 (e.g., the x-axis direction) to expand the display area of the flexible display 930, or slide in from the fourth side surface 944 toward the second side surface 942 (e.g., the -x-axis direction) to contract the display area of the flexible display 930. According to an embodiment, the electronic device 900 may include a first side surface cover 940a and a second side surface cover 940b to cover the first side surface 941 and the third side surface 943. According to an embodiment, the first side surface 941 and the third side surface 943 may be disposed not to be exposed to the outside through the first side surface cover 940a and the second side surface cover 940b.

According to various embodiments, the electronic device 900 may include a flexible display 930 disposed to be supported by the slide plate 960. According to an embodiment, the flexible display 930 may include a first area 930a (e.g., a first portion or a flat portion) supported by the slide plate 960, and a second area 930b (e.g., a second portion or a bendable portion) extending from the first area 930a and supported by the hinge rail 961. According to an embodiment, the second area 930b of the flexible display 930 may be disposed not to be exposed to the outside by being slid into the inner space of the housing 910 when the electronic device 900 is in the slide-in state (e.g., the state in which the slide plate 960 is slid into the housing 910), and may be exposed to extend from the first area 931 to the outside while being supported by the hinge rail when the electronic device 900 is in the slide-out state (e.g., the state in which the slide plate 960 is slid out from the housing 910). Therefore, the electronic device 900 may include a rollable type or slidable type electronic device in which the area of the display screen of the flexible display 930 changes depending on the movement of the slide plate 960 from the housing 910.

According to various embodiments, the slide plate 960 may be coupled to be movable in a sliding manner so as to be at least partially slid into or slid out from the housing 910. For example, the electronic device 900 may be configured to have a first width w1 from the second side surface 942 to the fourth side surface 944 in the slide-in state. According to an embodiment, in the state in which the slide plate 960 is slid out, the electronic device 900 may operate to have a third width w3 greater than the first width w1 by causing the hinge rail slid into the housing 910 to move to the outside of the electronic device so as to additionally have a second width w2.

According to various embodiments, the slide plate 960 may be operated through a user's manipulation. In various embodiments, the slide plate 960 may be automatically operated by a driving mechanism disposed in the inner space of the housing 910. According to an embodiment, the electronic device 900 may be configured to control the operation of the slide plate 960 via the driving mechanism when an event for shifting to the opened/closed state of the electronic device 900 is detected via a processor (e.g., the processor 120 in FIG. 1). In various embodiments, the processor (e.g., the processor 120 of FIG. 1) of the electronic device 900 may display objects in various ways and may perform control to execute an application to correspond to the changed display area of the flexible display 930 according to the opened state, the closed state, or the intermediate state of the slide plate 960.

According to various embodiments, the electronic device 900 may include at least one of an input device 903, sound output devices 906 and 907, sensor modules 904 and 917, camera modules 905 and 916, a connector port 908, a key input device (not illustrated), or an indicator (not illustrated). As an embodiment, in the electronic device 900, at least one of the above-mentioned components may be omitted, or other components may be additionally included.

According to various embodiments, the input device 903 may include a microphone. In various embodiments, the input device 903 may include a plurality of microphones arranged to detect the direction of sound. The sound output devices 906 and 907 may include speakers. The sound output devices 906 and 907 may include an external speaker 906 and a phone call receiver 907. As an embodiment, the sound output devices 906 and 907 may include a speaker that is operated without a separate speaker hole (e.g., a piezo speaker).

According to various embodiments, the sensor modules 904 and 917 may generate electrical signals or data values corresponding to the internal operating state of the electronic device 900 or an external environmental state. The sensor modules 904 and 917 may include, for example, a first sensor module 904 (e.g., a proximity sensor or an illuminance sensor) disposed on the front surface of the electronic device and/or a second sensor module 917 (e.g., an HRM sensor) disposed on the rear surface. According to an embodiment, the first sensor module 904 may be disposed under the flexible display 930 in the front surface 910*a* of the electronic device 900. According to an embodiment, the first sensor module 904 may further include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera devices 905 and 916 may include a first camera device 905 disposed on the front surface 910*a* of the electronic device 900 and a second camera device 916 disposed on the rear surface 910*b*. According to an embodiment, the electronic device 900 may include a flash 918 located in the vicinity of the second camera device 916. According to an embodiment, the camera devices 905 and 916 may include one or more lenses, an image sensor, and/or an image signal processor. According to an embodiment, the first camera device 905 may be disposed under the flexible display 930, and may be configured to photograph a subject through a portion of an active area of the flexible display 930. According to an embodiment, the flash 918 may include, for example, a light-emitting diode or a xenon lamp. In various embodiments, two or more lenses (e.g., a wide-angle lens and a telephoto lens) and image sensors may be disposed on one surface of the electronic device 900.

According to various embodiments, the electronic device 900 may include at least one antenna (not illustrated). According to an embodiment, the at least one antenna may wirelessly communicate with, for example, an external electronic device (e.g., the electronic device 104 in FIG. 1), or may wirelessly transmit/receive power required for charging. According to an embodiment, the antenna may include a legacy antenna, a mmWave antenna, a near-field communication (NFC) antenna, a wireless charging antenna, and/or a magnetic secure transmission (MST) antenna.

According to various embodiments, the housing 910 (e.g., a side surface frame) may be at least partially made of a conductive material (e.g., a metal material). According to an embodiment, in the housing 910, at least the first side surface 941 and/or the third side surface 943, which are not involved in driving the slide plate 960, may be made of a conductive material, and may be divided into a plurality of conductive portions (not illustrated) electrically insulated by a non-conductive material. According to an embodiment, the plurality of conductive portions may be electrically connected to a wireless communication circuit (e.g., the wireless communication module 192 of FIG. 1) disposed inside the electronic device 900, thereby being used as antennas operating in various frequency bands.

According to various embodiments, the electronic device 900 may include a dielectric sheet 932 disposed to at least partially overlap the flexible display 930 in the inner space thereof. According to an embodiment, the dielectric sheet 932 may have substantially the same size as the flexible display 930. In various embodiments, the dielectric sheet 932 may have a size smaller than that of the flexible display 930. According to an embodiment, the dielectric sheet 932 may include at least one array antenna AR1, AR2, or AR3 (e.g., the array antenna AR of FIG. 8) disposed in at least a partial area. For example, the at least one array antenna AR1, AR2, or AR3 may include a first array antenna AR1, a second array antenna AR2, and/or a third array antenna AR3. According to an embodiment, the at least one array antenna AR1, AR2, or AR3 may include, on the dielectric sheet 932, a first array antenna AR1 and a second array antenna AR2 disposed in an area overlapping the first area 930*a* in the dielectric sheet 932 when the flexible display 930 is viewed from above and a third array antenna AR3 disposed in an area overlapping the second area 930*b* when the flexible display 930 is viewed from above. According to an embodiment, the first array antenna AR1 may be disposed near the fourth side surface 944 in an area overlapping the first area 930*a* when the flexible display 930 is viewed from above. According to an embodiment, the second array antenna AR2 may be disposed near the first side surface 941 in an area overlapping the first area 930*a* when the flexible display 930 is viewed from above. According to an embodiment, the third array antenna AR3 may be disposed near the first side surface 941 in an area overlapping the second area 930*b* when the flexible display 930 is viewed from above. In various embodiments, the first array antenna AR1 and the second array antenna AR2 may be disposed on the first side surface 941, the second side surface 942, or the third side surface 943 in an area overlapping the first area 230*a* when the flexible display 930 is viewed from above. In various embodiments, the third array antenna AR3 may be disposed in at least a portion of the second side surface 942 or the third side surface 943 in an area overlapping the second area 930*b* when the flexible display 930 is viewed from above.

According to various embodiments, the first array antenna AR1 and the second array antenna AR2 may form beam patterns in the first direction (e.g., the z-axis direction), regardless of the closed state and/or the opened state of the electronic device 900. According to an embodiment, when the electronic device 900 is in the opened state, the third array antenna AR3 may form a beam pattern in the first direction (e.g., the z-axis direction). According to an embodiment, when the electronic device 900 is in the slide-in state, the third array antenna AR3 may form a beam pattern in the second direction (e.g., the -z-axis direction) according to the movement of the second area 930*b*. Accordingly, the electronic device 900 may be configured to expand beam coverage through the first array antenna AR1, the second array antenna AR2, and/or the third array antenna AR3 according to a state change. In various embodiments, when the electronic device 900 is in the slide-in state, the third array antenna AR3 may be disposed such that a beam pattern is formed at least partially in a direction (e.g., the -x direction) in which the second side surface 942 is oriented. In various embodiments, the first array antenna AR1, the second array antenna AR2, and/or the third array antenna AR3 may be disposed on the dielectric sheet 932, and may be replaced with one mesh pattern portion (e.g., the mesh pattern portion 510 of FIG. 5C) configured with multiple split lines (e.g., the split lines CL1 and CL2 of FIG. 5C) to be distinguished from a peripheral mesh pattern portion.

According to various example embodiments of the disclosure, the at least one array antenna AR1, AR2, or AR3 may be configured to form beam coverage in various directions according to a position change of the flexible display 930 according to a state change of the electronic device 900. For example, the dielectric sheet 932 including the at least one array antenna AR1, AR2, or AR3 is also applicable to an out-foldable electronic device in which a flexible display is visible from the outside in the folded state or a multi-foldable electronic device in which three or more housings operates to be folded in various ways with respect to each other.

According to various example embodiments, an electronic device (e.g., the electronic device 300 of FIG. 3C) may include: a housing (e.g., the housing 310 of FIG. 3A), a display panel (e.g., the display panel 431 of FIG. 4) disposed in an inner space of the housing to be visible from the outside through at least a portion of the housing, a dielectric sheet (e.g., the dielectric sheet 500 of FIG. 5C) including a conductive mesh (e.g., the conductive mesh structure 501 of FIG. 5C) disposed between the display panel and at least a portion of the housing and comprising a plurality of conductive lines (e.g., the plurality of conductive lines 515 of FIG. 5C), wherein the dielectric sheet includes at least one first mesh pattern portion (e.g., the first mesh pattern portion 510 of FIG. 5C) disposed in a first area (e.g., the first area 5011 of FIG. 5C) of the dielectric sheet, a second mesh pattern portion (e.g., the second mesh pattern portion 520 in FIG. 5C) disposed in a second area (e.g., the second area 5012 of FIG. 5C) at least partially surrounding the first area, and at least one dummy pattern (e.g., the dummy pattern portion 530 in FIG. 5C) splitting the at least one first mesh pattern portion and the second mesh pattern portion in a third area (e.g., the third area 5013 of FIG. 5C) between the first area and the second area, and a wireless communication circuit (e.g., the wireless communication module 192 of FIG. 1) disposed in the inner space and electrically connected to the at least one first mesh pattern portion. The at least one dummy pattern portion may include a plurality of split portions (e.g., the plurality of split portions 540 and 550 of FIG. 5C) comprising removed portions of the plurality of conductive lines in the third area, and at least some of the plurality of split portions are located at positions having different distances from an imaginary line (e.g., the first imaginary line L1 in FIG. 5C) extending in parallel along the length direction of the third area.

According to various example embodiments, at least some of the plurality of split portions may have different angles.

According to various example embodiments, at least some of the plurality of split portions may have different widths.

According to various example embodiments, the second mesh pattern portion may be configured as a sensing structure including a plurality of sensing pattern portions split by a plurality of split portions provided in the plurality of conductive lines.

According to various example embodiments, the at least one first mesh pattern portion may have a smaller size than each of the plurality of sensing pattern portions.

According to various example embodiments, the sensing structure may include a touch sensor and/or a fingerprint sensor.

According to various example embodiments, the first mesh pattern portion may include a first plurality of unit patterns configured with the plurality of conductive lines, and each of the sensing pattern portions may include a second plurality of unit patterns configured with the plurality of conductive lines.

According to various example embodiments, the first plurality of unit patterns and the second plurality of unit patterns may have a same size and/or shape.

According to various example embodiments, the first plurality of unit patterns and the second plurality of unit patterns may have different sizes and/or shapes.

According to various example embodiments, the at least one first mesh pattern portion may include two or more mesh pattern portions spaced apart from each other by a specified interval, and the wireless communication circuit may be configured to form a beam pattern in a direction in which the display panel is oriented via an array antenna comprising the two or more mesh pattern portions.

According to various example embodiments, the two or more mesh pattern portions may be disposed parallel to any edge of the dielectric sheet.

According to various example embodiments, at least a portion of the two or more first mesh pattern portions may overlap an active area of the display panel when the display panel is viewed from above.

According to various example embodiments, the at least one first mesh pattern portion may include a first feed line connected to a first point of the first mesh pattern portion and a second feed line connected to a second point spaced apart from the first point by a specified interval.

According to various example embodiments, the first feed line may include a first sub-line connected to the first point and perpendicular to the first point and a second sub-line extending from the first sub-line and perpendicular to an edge of the dielectric sheet.

According to various example embodiments, the second feed line may include a third sub-line connected to the second point and perpendicular to the second point and a fourth sub-line extending from the third sub-line and perpendicular to the edge.

According to various example embodiments, the electronic device may further include a flexible printed circuit board (FPCB) attached to the dielectric sheet and electrically connected to the first feed line and the second feed line.

According to various example embodiments, the electronic device may further include a printed circuit board disposed in the space, and the FPCB may be electrically connected to the printed circuit board.

According to various example embodiments, the wireless communication circuit may be disposed on the FPCB or the printed circuit board.

According to various example embodiments, the housing may include a front plate oriented in a first direction, a rear plate facing away from the front plate, and a side portion at least partially surrounding the inner space between the front plate and the rear plate, the display may be disposed in the inner space to be visible from the outside through the front plate, and the wireless communication circuit may be configured to form a beam pattern in a direction in which the display panel is oriented via the at least one first mesh pattern portion.

According to various example embodiments, the wireless communication circuit may be configured to transmit and/or receive a wireless signal in a frequency band ranging from 3 GHz to 300 GHz via the at least one first mesh pattern portion.

The embodiments of the disclosure and drawings are provided merely to illustrate specific examples and to describe the technical features according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure. It will also be understood that any of the embodiment(s) described herein may be used in conjunction with any other embodiment(s) described herein.

What is claimed is:

1. An electronic device comprising:
 a housing;
 a display panel disposed in an inner space of the housing to be visible from the outside through at least a portion of the housing;
 a dielectric sheet comprising a conductive mesh disposed between the display panel and at least a portion of the housing and including a plurality of conductive lines, the dielectric sheet including:
  at least one first mesh pattern portion disposed in a first area of the dielectric sheet,
  a second mesh pattern portion disposed in a second area of the dielectric sheet and at least partially surrounding the first area, and
  at least one dummy pattern splitting the at least one first mesh pattern portion and the second mesh pattern portion in a third area between the first area and the second area; and
 a wireless communication circuit disposed in the inner space and electrically connected to the at least one first mesh pattern portion,
 wherein the at least one dummy pattern portion comprises a plurality of split portions comprising partially removed portions of the plurality of conductive lines in the third area, and
 wherein at least some of the plurality of split portions are located at positions having different distances from an imaginary line extending in parallel along the length direction of the third area.

2. The electronic device of claim 1, wherein at least some of the plurality of split portions have different angles.

3. The electronic device of claim 1, wherein at least some of the plurality of split portions have different widths.

4. The electronic device of claim 1, wherein the second mesh pattern portion is configured as a sensing structure comprising a plurality of sensing pattern portions split by a plurality of split portions provided in the plurality of conductive lines.

5. The electronic device of claim 4, wherein the at least one first mesh pattern portion has a smaller size than each of the plurality of sensing pattern portions.

6. The electronic device of claim 4, wherein the sensing structure comprises a touch sensor and/or a fingerprint sensor.

7. The electronic device of claim 4, wherein the first mesh pattern portion may include a first plurality of unit patterns comprising plurality of conductive lines, and wherein each of the sensing pattern portions comprises a second plurality of unit patterns comprising a plurality of conductive lines.

8. The electronic device of claim 7, wherein the first plurality of unit patterns and the second plurality of unit patterns have a same size and/or shape.

9. The electronic device of claim 7, wherein the first plurality of unit patterns and the second plurality of unit patterns have different sizes and/or shapes.

10. The electronic device of claim 1, wherein the at least one first mesh pattern portion may include two or more mesh pattern portions spaced apart from each other by a specified interval, and
 wherein the wireless communication circuit is configured to form a beam pattern in a direction in which the display panel is oriented via an array antenna comprising the two or more mesh pattern portions.

11. The electronic device of claim 10, wherein the two or more mesh pattern portions are disposed in parallel to any edge of the dielectric sheet.

12. The electronic device of claim 1, wherein at least a portion of the at least one first mesh pattern portion overlaps an active area of the display panel when the display panel is viewed from above.

13. The electronic device of claim 1, wherein the at least one first mesh pattern portion comprises a first feed line connected to a first point of the first mesh pattern portion and a second feed line connected to a second point spaced apart from the first point by a specified interval.

14. The electronic device of claim 13, wherein the first feed line comprises a first sub-line connected to the first point perpendicular to the first point and a second sub-line extending from the first sub-line perpendicular to an edge of the dielectric sheet.

15. The electronic device of claim 14, wherein the second feed line may include a third sub-line connected to the second point perpendicular to the second point and a fourth sub-line extending from the third sub-line perpendicular to the edge of the dielectric sheet.

16. The electronic device of claim 13, further comprising a flexible printed circuit board (FPCB) attached to the dielectric sheet and electrically connected to the first feed line and the second feed line.

17. The electronic device of claim 16, further comprising a printed circuit board disposed in the space,
 wherein the FPCB is electrically connected to the printed circuit board.

18. The electronic device of claim 17, wherein the wireless communication circuit is disposed on the FPCB or the printed circuit board.

19. The electronic device of claim 1, wherein the the housing comprises:
 a front plate oriented in a first direction,
 a rear plate facing away from the front plate, and
 a side portion at least partially surrounding the inner space between the front plate and the rear plate,
 wherein the display is disposed in the inner space to be visible from the outside through the front plate, and
 wherein the wireless communication circuit is configured to form a beam pattern in a direction in which the display panel is oriented via the at least one first mesh pattern portion.

20. The electronic device of claim 1, wherein the wireless communication circuit is configured to transmit or receive a wireless signal in a frequency band ranging from 3 GHz to 300 GHz via the at least one first mesh pattern portion.

* * * * *